(12) United States Patent  (10) Patent No.: US 7,513,414 B1
Block et al.  (45) Date of Patent: *Apr. 7, 2009

(54) CASH DISPENSING AUTOMATED BANKING MACHINE USER INTERFACE SYSTEM AND METHOD

(75) Inventors: James Block, North Lawrence, OH (US); Paul D. Magee, North Canton, OH (US); Harold V. Putman, Lexington, KY (US); H. Thomas Graef, Bolivar, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/175,892

(22) Filed: Jul. 6, 2005

Related U.S. Application Data

(60) Provisional application No. 60/643,420, filed on Jan. 11, 2005, provisional application No. 60/586,382, filed on Jul. 7, 2004.

(51) Int. Cl.
G06Q 40/00 (2006.01)
(52) U.S. Cl. .......................... 235/379; 235/381; 705/43
(58) Field of Classification Search .................. 235/379, 235/381; 705/43
See application file for complete search history.

(56) References Cited

U.S. PATENT DOCUMENTS

| | | | | |
|---|---|---|---|---|
| 5,752,239 A | * | 5/1998 | Coutts | 705/26 |
| 5,983,284 A | * | 11/1999 | Argade | 710/1 |
| 6,036,089 A | * | 3/2000 | Oguchi et al. | 235/379 |
| 6,061,666 A | * | 5/2000 | Do et al. | 705/43 |
| 6,732,918 B2 | * | 5/2004 | Coventry | 235/379 |
| 7,100,820 B2 | * | 9/2006 | Michelassi et al. | 235/379 |
| 7,146,577 B2 | * | 12/2006 | Hoffman | 715/865 |
| 7,175,076 B1 | * | 2/2007 | Block et al. | 235/379 |
| 7,229,007 B1 | * | 6/2007 | Swaine et al. | 235/379 |
| 7,258,269 B1 | * | 8/2007 | Block et al. | 235/379 |
| 7,350,700 B1 | * | 4/2008 | Block et al. | 235/379 |

* cited by examiner

*Primary Examiner*—Thien M. Le
*Assistant Examiner*—Tuyen K Vo
(74) *Attorney, Agent, or Firm*—Ralph E. Jocke; Daniel D. Wasil; Walker & Jocke

(57) ABSTRACT

An automated banking machine is operative to enable users to operate the machine to carry out transactions such as the dispensing of cash. The exemplary machine provides audible instructions which are output through external loudspeakers, a headphone, or a handset. Rotation of a rotatable knob (372, 382) or other movable item causes the output of user selectable characters, transaction types and/or amounts corresponding to each respective position. The user selects the audible output produced in the current position of the knob for receipt by the machine as a transaction input by pressing on the knob. Characters and other selectable inputs corresponding to knob positions can be varied by the computer in the machine to reduce the risk of a criminal intercepting the user's inputs to the machine.

35 Claims, 15 Drawing Sheets

US 7,513,414 B1

CASH DISPENSING AUTOMATED BANKING MACHINE USER INTERFACE SYSTEM AND METHOD

CROSS REFERENCE TO RELATED APPLICATIONS

This application claims benefit pursuant to 35 U.S.C. § 119(e) of Provisional Application 60/586,382 filed Jul. 7, 2004 and Provisional Application 60/643,420 filed Jan. 11, 2005, the disclosures of each of which are incorporated herein by reference.

TECHNICAL FIELD

This invention relates to automated banking machines. Specifically, the exemplary form of the invention relates to input devices for a cash dispensing automated banking machine apparatus and systems such as one that is more readily operated by a consumer that is visually impaired.

BACKGROUND ART

A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers' checks. For purposes of this disclosure, references to an ATM, an automated banking machine or automated transaction machine shall encompass any device which carries out transactions including transfers of value.

ATMs generally include a display device such as a CRT or LCD which is operative to output a visual user interface. The user interface includes instructions and selectable options which visually guide a user through the operation of the machine. For example, ATMs often include a hierarchical menu for navigating through a plurality of different user interface screens. Such menus often list various types of transaction functions which may be performed at the ATM such as a withdrawal of cash or the deposit of a check. Although a consumer with normal vision can readily operate such an ATM by following the commands visually presented through the display device, a consumer who is visually impaired may not be able to operate such an ATM as easily.

ATMs also often have input devices such as keypads and touch screens which are used by consumers to provide inputs. Such inputs may include confidential information such as a user's personal identification number (PIN). There is a risk that confidential inputs can be intercepted by criminals. Such interception may occur by surreptitious observation or by installing devices that intercept data corresponding to the keypad buttons pressed by the user.

ATM input devices currently provide users with less input options then may be desirable in some situations.

As a result, there exists a need for an ATM with improved user input devices. There further exists a need for an ATM which is capable of being operated by consumers with either normal or impaired vision and/or which has improved resistance to the unauthorized interception of user inputs.

DISCLOSURE OF INVENTION

It is an object of an exemplary form of the present invention to provide an automated banking machine at which a user may conduct transactions.

It is a further object of an exemplary form of the present invention to provide an automated banking machine that may be operated by consumers with normal vision.

It is a further object of an exemplary form of the present invention to provide an automated banking machine that may be operated by consumers with impaired vision.

It is a further object of an exemplary form of the present invention to provide an automated banking machine with improved user input capabilities.

It is a further object of an exemplary form of the present invention to provide an automated banking machine with improved resistance to unauthorized interception of customer inputs.

It is a further object of an exemplary form of the present invention to provide improved methods of operation of an automated banking machine.

Further objects of exemplary forms of the present invention will be made apparent in the following Best Modes for Carrying Out Invention and the appended claims.

The foregoing objects are accomplished in one exemplary embodiment by an automated banking machine that includes output devices such as a display screen and audible output device, and input devices such as a touch screen, a keypad, card reader and other type input device. The banking machine may further include devices such as a cash dispenser mechanism for dispensing sheets or other items of currency, a printer mechanism, a depository mechanism and other transaction function devices that are used by the machine in carrying out banking transactions.

The exemplary banking machine is in operative connection with at least one computer. The computer is in operative connection with the output devices and the input devices, as well as with the cash dispenser mechanism, and other physical transaction function devices in the banking machine. The computer includes software programs that are executable therein. The software may include terminal control software which is operative to cause the machine to perform a plurality of different transaction functions. In addition, the terminal control software of the exemplary embodiment may be operative to cause the machine to provide both a visual and audible user interface outputs for guiding a consumer through the operation of the machine.

In one exemplary embodiment, the terminal control software may be operative to cause the computer to output a visual menu for navigating between different user interface screens. Such screens may include transaction information and selectable options for operating the automated banking machine. For each visual user interface screen, the exemplary embodiment of the terminal control software may be operative to cause the computer to output corresponding audible outputs through external speakers, a handset and/or an output device that is connectable to a set of headphones. The audible outputs may include simulated verbal instructions which describe the functions and operations available for the current state of the banking machine. Such audible verbal instructions may further include a description of which keys, buttons, transaction function devices, and other input devices to press, manipulate, or activate in order to perform the available machine functions and operations. In addition, such audible verbal instructions may further include a description of the relative locations of the keys, buttons, transaction function devices, and other input devices for performing the functions and operations. Further, such verbal instructions may include a description of how to use or manipulate the keys, buttons, transaction function devices, and other input devices of the banking machine. For example, to initially activate the automated banking machine, the audible verbal instructions may include a description of the location of a card reader of the machine and indicate in what orientation a card may be inserted and/or swiped in the card reader for purposes of being read. Further audible verbal instructions may describe the types of transaction functions that are available and which keys or other input devices must be pressed or manipulated in order to either select, modify, or cancel each of the transaction functions.

As used herein, the term "verbal" corresponds to human language words generated by either a recorded human voice, machine synthesized human voice emulation or combinations thereof. In exemplary embodiments, audible verbal instructions may include a plurality of words produced responsive to digital or analog recordings of either a human voice or computer synthesized voice. In addition, audible verbal instructions may be produced directly from hardware devices and/or software programs operating in the ATM which are capable of synthesizing human language words, sentences, syllables and other human language communication sounds. Such hardware devices and/or software programs for example may include text to speech synthesizer devices which are operative to generate sound signals or audible outputs which include verbal instructions responsive to alphanumeric text.

Some exemplary embodiments may include a plurality of features which enable the machine to be easily and conveniently used by the visually impaired. For example, in an exemplary embodiment, the automated banking machine may enable a consumer to repeat the last audible verbal instructions with the press of a single button and/or key. Also, for each key press or other input, the banking machine may be operative to audibly identify the letter, number, and/or function of the key.

In an exemplary embodiment, the automated banking machine may enable the consumer to cycle through a plurality of volume changes with the press of a single button and/or key. Further, the banking machine may be operative to automatically mute any external loudspeakers of the banking machine upon the detection of the operative connection of headphones to the machine by a user or the pick up by the user of a handset. In addition, an exemplary embodiment of the banking machine may be operative to set the headphone or handset volume at a predetermined low level with each new consumer session. The consumer may then press the volume key and/or button to increase the volume level of the headphones to a desirable level.

Exemplary embodiments may include an audio system which enables the automated banking machine to have one or more of the previously described audible features. The audio system may be operative to accept and adjustably mix together inputs from a plurality of audio sources, including multimedia inputs such as MP3 streams, voice inputs such as from WAV files, and system keyboard and/or prompting beeps. An exemplary embodiment of the audio system may further include both external and headphone connection ports which are operative to individually and selectively amplify and output the mixed signals through external loudspeakers and headphones placed in operative connection with connection ports.

The exemplary audio system may be operative to detect the connection of a headphone to the headphone port, automatically mute the output to the external port which is connected with external speakers, and set the headphone volume at a minimum level. In addition, the exemplary audio system may be operative to detect the removal of the headphone from connection with the headphone port, and automatically reinstitute the output through the external port.

In some exemplary embodiments, the audio system may further be operative to selectively step through a plurality of headphone volume levels responsive to one or more volume changing inputs. Such inputs may be directly received from a key or button in operative connection with the new audio system. In alternative exemplary embodiments of the audio system, signals corresponding to a volume change may be received from one or more buttons of the banking machine.

In alternative exemplary embodiments, the ATM includes a user interface that facilitates the receipt of inputs by the machine and which reduces the risk of interception of inputs by criminals. In exemplary embodiments, the user interface includes an item which is manipulated by the user to select inputs. The machine provides the user with verbal outputs corresponding to the position to which the user has moved the item. This is done in exemplary embodiments through verbal outputs provided to the user via headphones, a handset, or other non-visual communication methods.

In exemplary embodiments, the interface includes a rotatable knob which the user can turn to a plurality of positions and which the user can press to make or change a selection. In an exemplary embodiment, the user inputs their card to the machine and can provide their corresponding PIN number through movement of the rotational knob. In exemplary embodiments, the user is advised of the character, such as a letter of the alphabet or a numerical value which corresponds to the initial position of the knob, and is instructed as to the directions to rotate the knob to increment and decrement from the initial character. As the user turns the knob through a plurality of positions, the ATM provides verbal outputs to the user through the headphones, handset or other methodology, as to the particular character which corresponds to the position in which the user has placed the knob. When the user has turned the knob to the selected character, the user presses the knob to indicate that that character is part of the code such as a PIN number or other series of characters that the user is to input.

In some exemplary embodiments, the initial character can be selected through operation of one or more computers in the ATM in a random fashion. In this way, it becomes much more difficult for an unauthorized observer to intercept the user's inputs. The user can provide a plurality of characters in this manner to the ATM until all the characters in the PIN number or other code have been input.

In exemplary embodiments, ATM users can also provide other inputs through this exemplary interface. For example, after the user has input their code corresponding to their PIN number, the user may be instructed to rotate the knob to select the desired transaction type. As the user rotates the knob through various positions, the ATM provides verbal and/or visual instructions as to each transaction type corresponding to each position. When the user has moved the knob to a position which corresponds to the desired transaction type, the user can cause the machine to receive the input of the selected transaction type by pressing the knob.

A similar approach may also be taken for the ATM to receive the amount associated with the user's selected transaction type. The user may turn the knob to a plurality of positions as the machine provides audible and/or visual outputs to the user of the monetary value associated with each respective position. For example, if the user has selected to conduct a cash withdrawal type transaction, the machine may provide the user with instructions on how to increase or decrease the amount of value that the machine will dispense. As the user rotates or otherwise moves the knob through various positions, the machine provides outputs corresponding to amounts. When the knob has been turned to a position corresponding to the desired amount output, the user can select the amount by pressing the knob. A computer then operates to cause the ATM to communicate with a remote host computer to determine if the transaction is authorized, and if so causes the ATM to dispense the selected amount to the user.

In alternative embodiments, various properties may be caused to be output through the knob to facilitate the user's operation thereof through the sense of touch. For example, in some embodiments the knob may be caused to output a manually perceptible "click" as the knob moves into each position. Alternatively or in addition, the knob movements may have properties that include stops, bumps, areas of resistance, or other features that correspond to the selections that the user is being asked to make. Such perceptible resistance changes or vibratory aspects of the knob may be applied through appropriate mechanical devices such as solenoids, brakes, motors, ratchets, or other items that provide the desired manually perceptible properties.

Of course, in other embodiments other types of movable items may be provided on the banking machine so as to receive user inputs. Further, in some embodiments the functions of moving through a plurality of positions corresponding to choices, and the selection of a particular choice may be divided between two devices, such as, for example, a movable lever and a push button. Numerous approaches applying the principles described may be used in alternative embodiments.

BEST MODES FOR CARRYING OUT INVENTION

Figure 1:
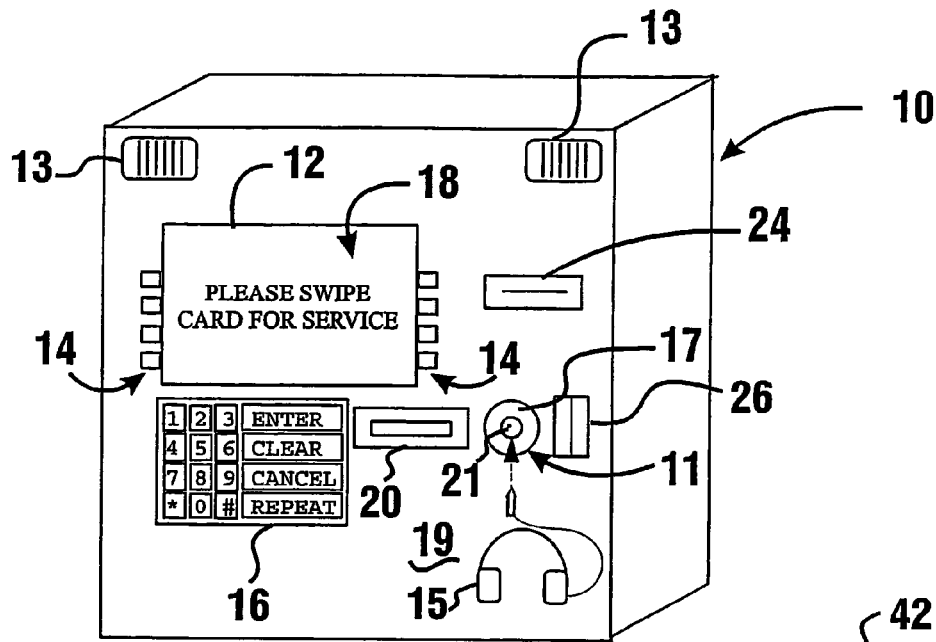
FIG. 1 is a perspective view representative of an exemplary embodiment of an ATM incorporating features described herein.

Referring now to the drawings and particularly to FIG. 1, there is shown therein a perspective view of an exemplary automated banking machine such as an ATM 10 including certain useful features. The exemplary embodiment of the ATM 10 includes output devices such as a display device 12 and external loudspeakers 13. The display device 12 is operative to provide a consumer with a user interface 18 that includes a plurality of screens or other outputs including selectable options for operating the machine. The external loudspeakers 13 may be operative to provide a consumer with audible music, beeps, signals, and/or verbal instructions for operating the machine.

The exemplary embodiment of the ATM 10 may further include at least one output device such as an external port 11. In the exemplary embodiment of the ATM 10, the external port 11 includes a speaker port such as a headphone port 21 for operatively connecting portable speaker devices such as a set of headphones 15 to the ATM. In other exemplary embodiments, the external port 11 may comprise a wireless connection port. For example, in an alternative exemplary embodiment of the ATM 10, the external port 11 may include a wireless communication device which is operative to communicate with a wireless headphone set or other external device capable of providing audible, visual or other user perceivable outputs. Such wireless communication devices may communicate with the external device using RF or IR, for example. In alternative embodiments the ATM may include a handset or other audio communication device.

In the exemplary embodiment, the external port 11 may include a base 17 with a useful shape that is not flush with the fascia 19 of the ATM 10. The shape of the base 17 may have a distinctive contour which enables a consumer with impaired vision to quickly locate the external port by touching the fascia 19 and base 17 of the ATM. For example, in one exemplary embodiment, the base of the external port may include a concave portion with a female headphone jack or port 21 positioned generally in the center of the concave portion. In further exemplary embodiments, the base 17 of the external jack may extend from the fascia 19 and have a distinctive contour or edge shape such as that of a square, circle, triangle, or other unique shape that is identifiable by touch.

The exemplary ATM 10 may include a plurality of input devices such as function keys 14 and a keypad 16. The exemplary embodiment of the ATM 10 may further include other types of input devices, such as a touch screen, microphone, card reader 26, biometric reader or any other device that is operative to provide the ATM with inputs representative of user instructions or information. The exemplary ATM 10 may further include a plurality of transaction function devices, such as a sheet or cash dispenser 20, receipt printer 24 and other devices.

Figure 2:
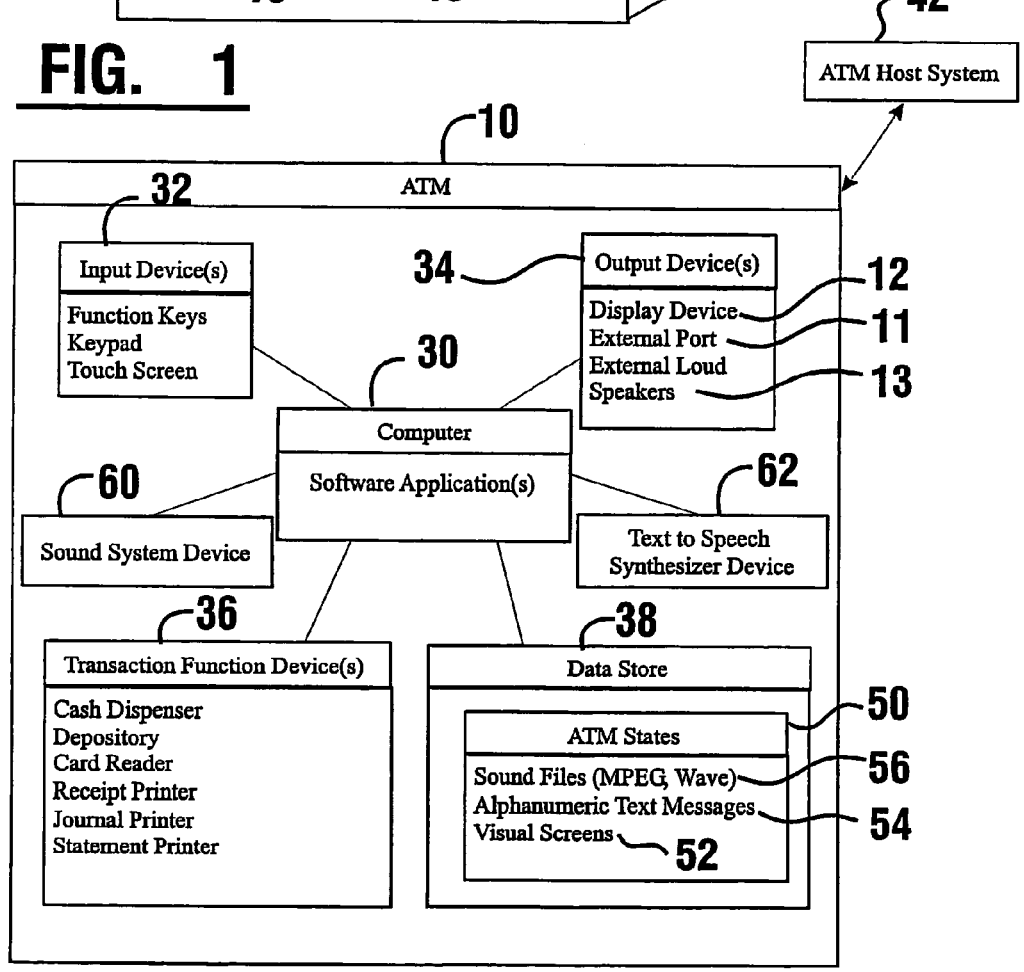
FIG. 2 is a schematic view of the exemplary embodiment of the ATM.

FIG. 2 shows a schematic view of components which may be included in an exemplary embodiment of the ATM and a system in which it is operated. The ATM 10 may include at least one computer 30 which is alternatively referred to herein as a processor. The computer 30 may be in operative connection with the input device(s) 32, the output device(s) 34, the transaction function device(s) 36 and at least one data store 38. The exemplary embodiment further includes one or more software application(s) 40 operative in the computer 30. The software applications may include for example terminal control software, maintenance software, diagnostic software and any other software that enables the ATM to perform transaction functions for users and/or enables authorized representatives of an operator of the ATM to service, configure and maintain the ATM. An exemplary embodiment of an ATM may be operative to communicate with a host banking system 42 to enable a consumer to perform such exemplary transaction functions as withdrawing cash from an account through operation of the cash dispenser device 30, depositing checks or other items with the depository device, performing a balance inquiry for a financial account and transferring value between accounts.

The exemplary embodiment may be operative to provide a consumer with a user interface which comprises outputs that may be visually displayed and/or output in audible form for the consumer. The exemplary user interface may guide the consumer through the selection of one or more functions which are to be performed by the ATM. Such functions may include a plurality of different transaction functions such as the dispense of cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the ATM. In addition, functions may also include options for making the user interface more user friendly, such as functions that repeat an audible instruction, or that provide help or a description for other functions of the ATM.

The exemplary embodiment of the ATM includes at least one software application such as a terminal control software program that at any given time is operative to be in one of a plurality of different states. To perform transaction functions, the terminal control software may progress between the various states, prompting the user to input different types of information in some states and performing a transaction function in other states in response to the inputted information.

The exemplary embodiment of the ATM may operate to organize different transaction functions into a hierarchy using a plurality of menus and sub-menus (also referred to herein as "screens"). A menu may be visually and/or audibly output to the consumer for each of the different states the ATM is operative to progress through to select and perform the transaction functions. Each menu may be operative to list those functions which may be performed in any given state of the ATM. Selecting an option or function visually listed or verbally described in a menu may cause the ATM to change to a different state which causes a display and/or output of an audible verbal description of a sub-menu of options or functions available to be performed by the ATM in the new state.

The exemplary data store 38 of the ATM may be operative to store therein, information for generating visual outputs and audible outputs that are representative of menus and sub-menus for a plurality of different states 50 of the ATM. Such information, for example may include stored data for producing visual outputs such as visual screen data 52 for operative states of the ATM. Such information may further include stored data for producing audio outputs such as MP3 or WAV sound files 56 which include verbal instructions for operative states of the ATM. Such stored data for producing audio outputs may also include alphanumeric text messages 54 (also referred to herein as "text-to-speech data"), which may be used by the computer 30 to generate audible verbal instructions for operative states of the ATM. In exemplary embodiments, the visual screen data 52 may be accessed by the computer and used to produce visual outputs through the display device 12. Also, the audio output data such as the sound files 56 and/or text messages 54 may be accessed by the computer and used to produce audible outputs with verbal instructions or descriptions through external loudspeakers 13 and/or headphones. In an exemplary embodiment, the ATM may receive visual screen data and/or audio output data from a host banking system.

As shown in FIG. 2, the ATM 10 may further include a sound system device 60 in operative connection with the computer. The exemplary sound system device 60 may be operative to produce signals that produce audible outputs. Such signals may be directed to the external port 11 and/or the external loudspeakers 13. In one exemplary embodiment, the sound system device may be operative to selectively mix and amplify a plurality of different audio input signals to generate an amplified audible output signal. Alternative exemplary embodiments of the ATM 10 may further include a text to speech synthesizer device 62 which is operative to convert the text messages 54 into the verbal instructions or descriptions included in the audible outputs of the ATM.

The exemplary embodiment of the ATM 10 may be designed to be used by consumers with normal vision as well as users who have impaired vision or who are blind. For example, a user with normal vision may view the display screen to read instructions for operating the ATM 10. A user with impaired vision may listen to verbal instructions and descriptions output from the external loudspeakers 13. In addition, a user with impaired vision may operatively connect a personal set of headphones 15 or other device with the external port 11 of the ATM to listen to verbal instructions and descriptions in private. As used herein, the phrases "verbal instructions" or "verbal descriptions" are used interchangeably, and may include verbal instructions, commands, descriptions, and/or any other form of audible information that is susceptible to human comprehension.

In an exemplary embodiment, the sound system device 60 may be operative to detect the impedance change across the external port 11 when headphones 15 are electronically connected to the external port. When the connection is detected, the sound system device 60 and/or computer 30 may be operative to mute any audible output being directed to the external loudspeakers 13. The computer may then be operative to output private verbal instructions through the headphones which describe to the user how the ATM may be operated. In exemplary embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operative to change the volume level of the audible output being directed to the headphones or other device through the external port to a predetermined level. Such a predetermined level may correspond to a relatively low volume level that is not likely to cause discomfort to the majority of consumers using the ATM. In the exemplary embodiment, the sound system may be in operative connection with one or more volume changing switches, keys, dials, buttons or other devices which are accessible to the consumer. After the operative connection of the headphones or other device to the external port, the volume changing devices may be operated by the consumer to increase or decrease the volume level as desired by the consumer. In an exemplary embodiment, the sound system device may further be operative to detect when the headphone has been disconnected with the external port. When this occurs the sound system and/or the computer may be operative to mute the audible output to the external port and institute the audible output through the external loudspeakers.

In alternative exemplary embodiments, a key of a keypad of the ATM may be operative to control the volume of audio outputs. When a designated volume key of the keypad or other key is pressed or actuated, the computer may be operative to cause the ATM to change the current volume level and audibly output a word such as "Volume" at the newly selected volume level. For example, when a consumer presses the volume key of the keypad twice in succession, an exemplary embodiment of the banking machine may be operative to output the word "Volume" twice with the second occurrence of the word "Volume" being louder than the first occurrence. When the volume has reached a maximum level, the next time the volume key of the keypad is pressed, the exemplary ATM may be operative to return the volume level to a predetermined minimum usable volume level and output a word such as "Volume" at the corresponding minimum volume level.

Figure 3:
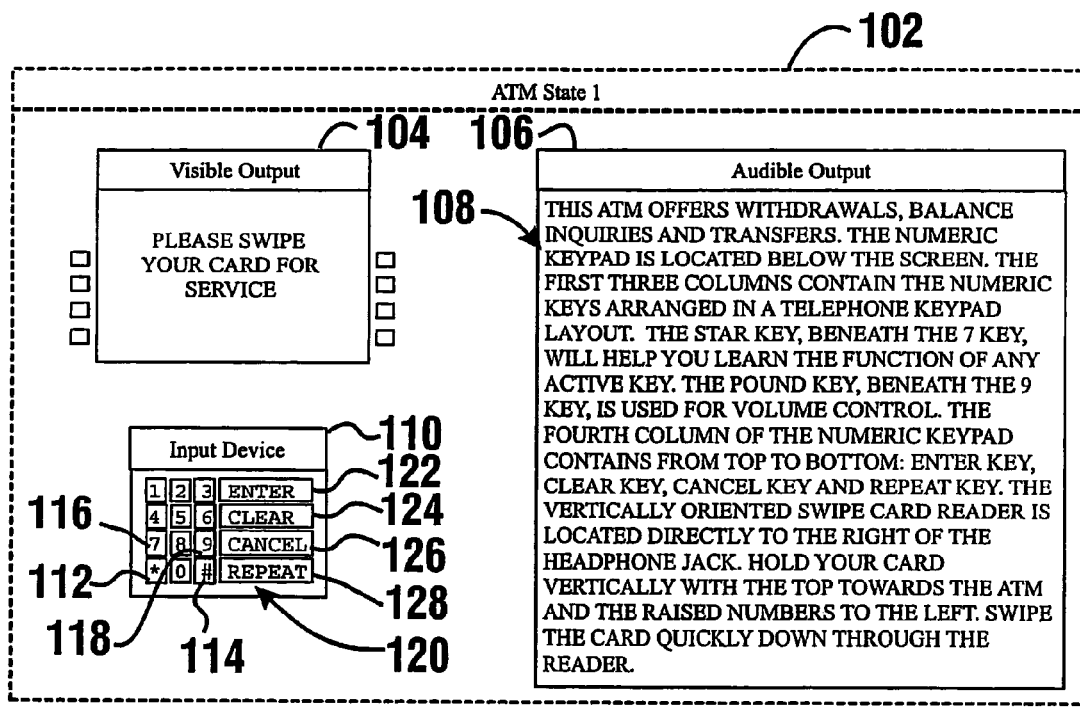
FIGS. 3-13 are schematic views of the exemplary embodiment of the ATM in a plurality of different states of operation.

FIGS. 3-8 show schematic views of the ATM 10 in a plurality of different states. Such states are examples of one exemplary path a consumer may take through the hierarchy of user interface menus for purposes of operating the ATM 10. FIG. 3 shows the ATM 10 in a first mode or state 102 which may be active when a user first approaches the machine. Here the ATM is operative to attract or invite consumers to use the services of the ATM. The exemplary embodiment of the ATM may include a visible output 104 through a display device of the ATM. The visible output may include indicia such as text which informs the consumer that the card may be swiped for initiating operation of the machine.

For users that are visually impaired, the exemplary ATM may further be operative to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the ATM and may describe the physical locations and/or configurations of the input devices. In addition, the verbal instructions may describe how the input device may be manipulated to select different functions of the machine and may further describe what the functions perform. Also, the verbal instructions may describe the location of transaction function devices and describe how the transaction function devices may be used.

For example, in the state shown in FIG. 3 the verbal instructions may indicate that the ATM offers transaction functions such as withdrawals, balance inquiries and transfers. In addition the verbal instructions may indicate that the keypad 110 is located below the display screen. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operative to help the consumer learn the function of any active key. The pound "#" key 114 may be indicated to be below the nine "9" key 118 and is used for volume control. A fourth column 120, of keys in the exemplary keypad may be described as including from top to bottom an enter key 122, a clear key 124, a cancel key 126, and a repeat key 128. The exemplary output verbal instructions 108 may further indicate that the swipe card reader is vertically orientated and is located to the right of the headphone jack. Exemplary audible outputs may also indicate that the swipe reader is to be used by holding a credit or debit card vertically with the top toward the ATM and with the raised numbers to the left and by swiping the card quickly down through the slot in the reader. Of course these outputs are exemplary and in other embodiments other approaches may be used.

Figure 4:
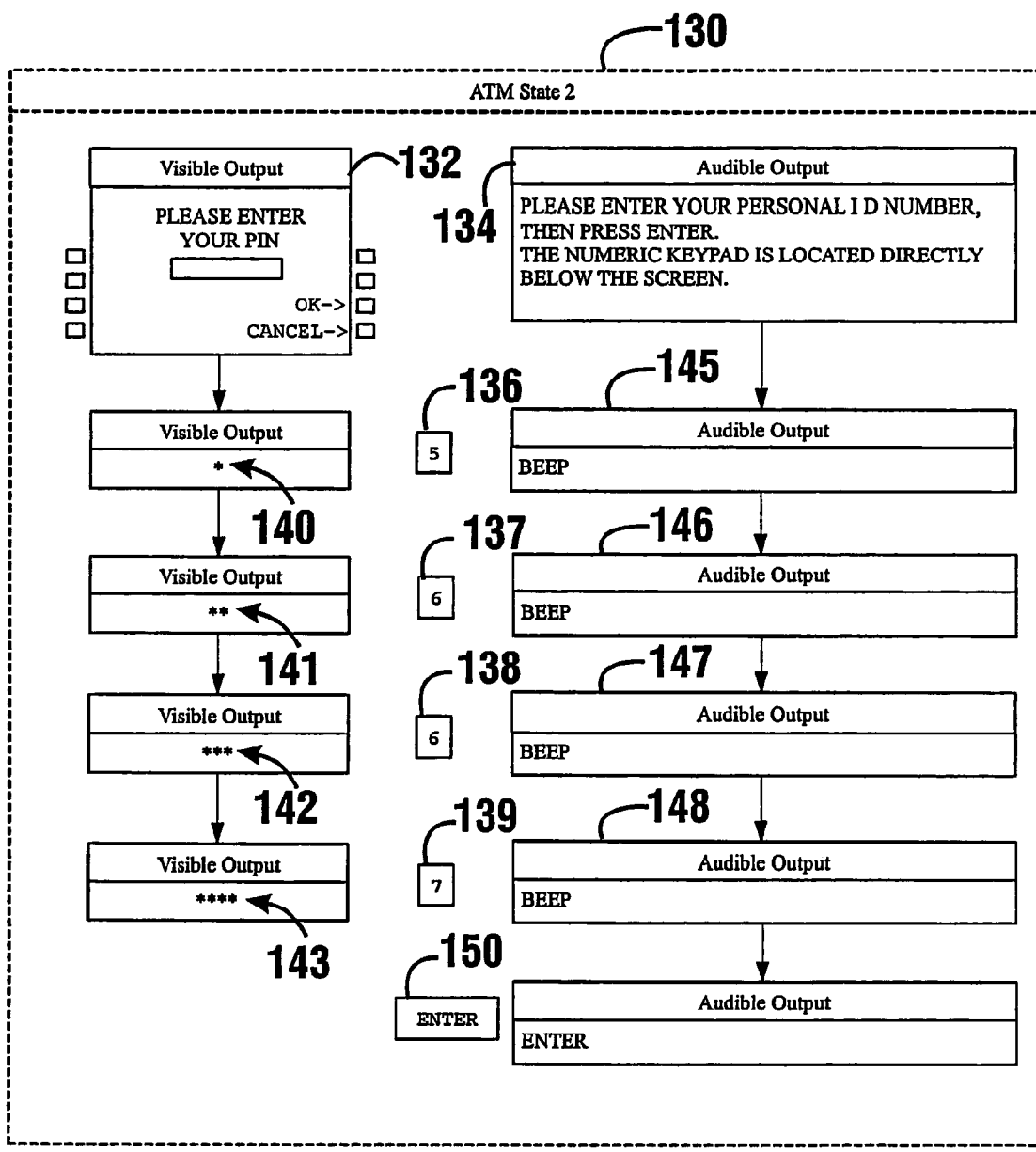

As shown in FIG. 4, the exemplary ATM may be operative to change to a second state 130, after the consumer successfully swipes and/or inserts a card using the card reader of the ATM. In this second state 130, the ATM may be operative to accept the input of a Personal Identification Number (PIN). Both the visible output 132 and the audible output 134 produced when the ATM is in this state, may request that the consumer enter a PIN. As a consumer presses each of the numeric keys 136-139 of the keypad which correspond to the consumer's PIN, the exemplary ATM may be operative to both visually and audibly acknowledge each input. For example, the visible output 132 may be updated with each key press to display an additional asterisk symbol 140-143. In addition, with each key press the ATM may be operative to produce additional audible outputs 145-148 which may include a beep, or other sound acknowledging each input. When the audible output is privately being communicated to the user through headphones for example, the audible outputs 145-148 may correspond to the verbal description of each number being pressed. When the user presses the enter key 150, the exemplary ATM is operative to produce a further audible output which includes a verbal description representative of the enter key such as for example the word "ENTER."

Figure 5:
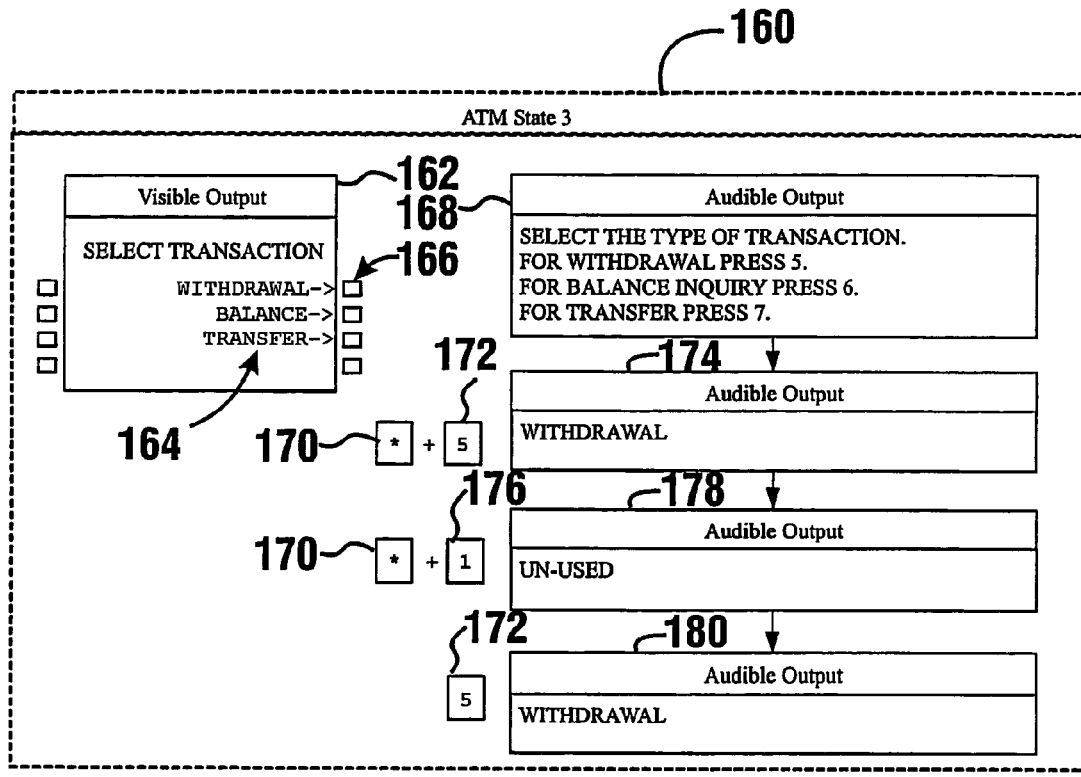

Once the consumer inputs a PIN and presses the enter key 150 of the keypad, the exemplary ATM may be operative to change to a third state in which the ATM is operative to enable the consumer to select one of a plurality of transaction functions to be performed with the ATM. As shown in FIG. 5, when the ATM is in a third state 160 the ATM may produce a visible output 162 which lists the transaction functions 164 and visually points to the function keys 166 that are operative to select each transaction function.

In the exemplary ATM, this described third state may cause the computer in the ATM to produce audible outputs 168 which describe which keys of the keypad are operative to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the exemplary embodiment, the ATM may be operative to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described exemplary embodiment the star "*" key may indicate to the ATM that the next following key is to be verbally described or named. As shown in FIG. 5, when the consumer presses the star "*" key 170 followed by the five "5" key 172, the ATM may be operative to produce a further audible output 174 which verbally indicates the name of the function such as "Withdrawal." When a help key such as the star "*" key 170 is actuated in this embodiment, the ATM may only describe the function associated with the next key press rather than changing to a further state corresponding to such a key press.

If the consumer presses the star "*" key 170 followed by a key that is not associated with a function in the current state, such as the one "1" key 176, the exemplary ATM may be operative to produce a further audible output 178. The further audible output may verbally indicate that the key is not being used in the current state of the ATM with an expression such as "Un-used."

In an exemplary embodiment, the second key for which the user wishes to receive an indication of the function must be pressed within a predetermined time period after the star "*" key 170 is pressed. Such a time period may for example be ten seconds. Of course, these approaches are exemplary and in other embodiments other approaches may be used.

Figure 6:
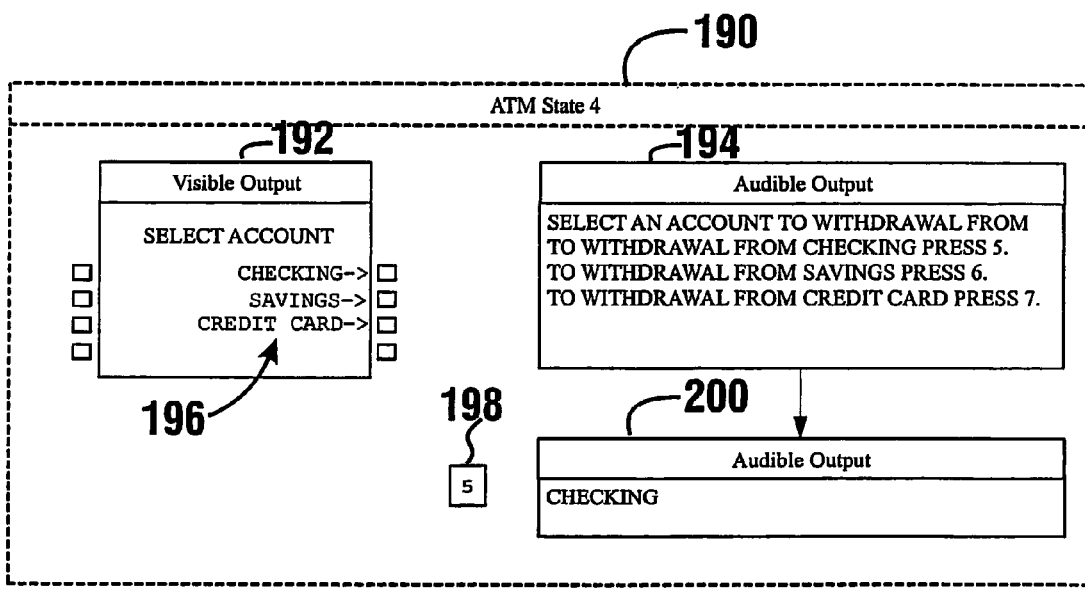

In the exemplary embodiment, when a consumer selects a transaction by pressing a key associated with the transaction, such as the five "5" key 172 without pressing the star "*" key 170, the ATM may be operative to change to a fourth state and produce another audible output 180 which verbally indicates to the user the name of the selected function. As shown in FIG. 6, the fourth state 190 may include a visual and an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the exemplary ATM may be operative to produce a further audible output 200, which verbally describes what the consumer has selected. For example, if the consumer presses the five "5" key 198, the audible output 200 may indicate the name of the selection by outputting a word such as "Checking."

Figure 7:
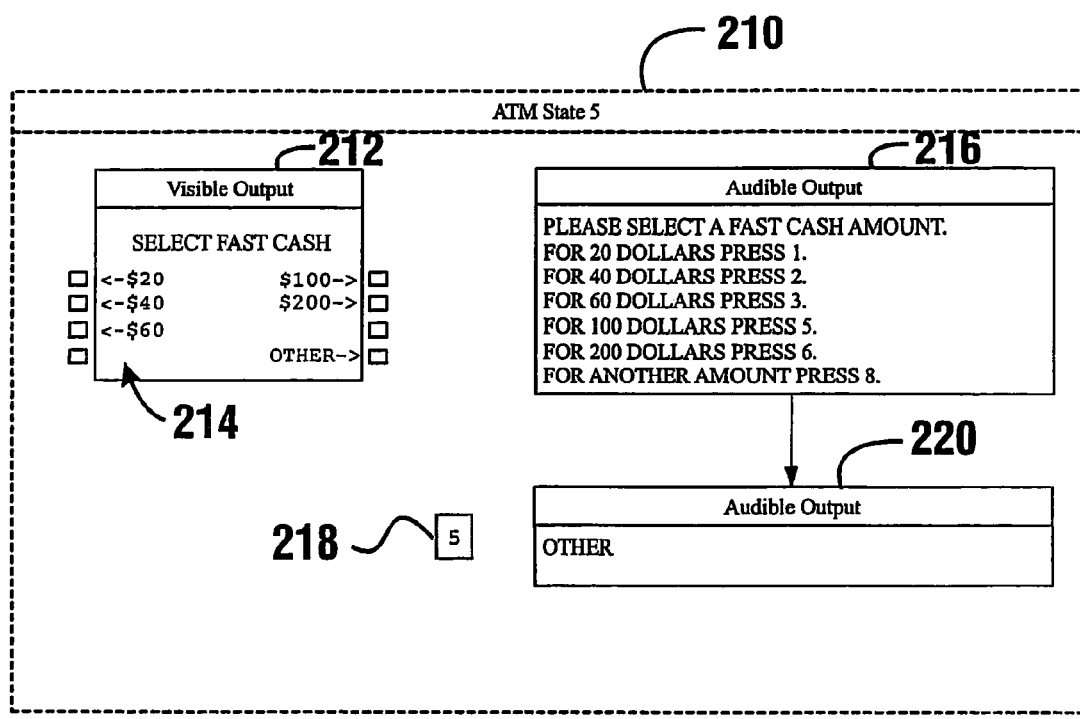

For a withdrawal transaction function, the exemplary embodiment may change to a further state after a selection of an account has been made. FIG. 7 shows an example of a fifth state 210, in which the ATM may be operative to accept the selection of an amount of cash to be withdrawn. Here, the ATM may be operative to produce a visible output 212 which lists a plurality of currency amounts 214 which may be selected. Likewise, the ATM may be operative to produce an audible output 216 which verbally indicates which keys of the keypad to press in order to select a particular currency amount.

Figure 8:
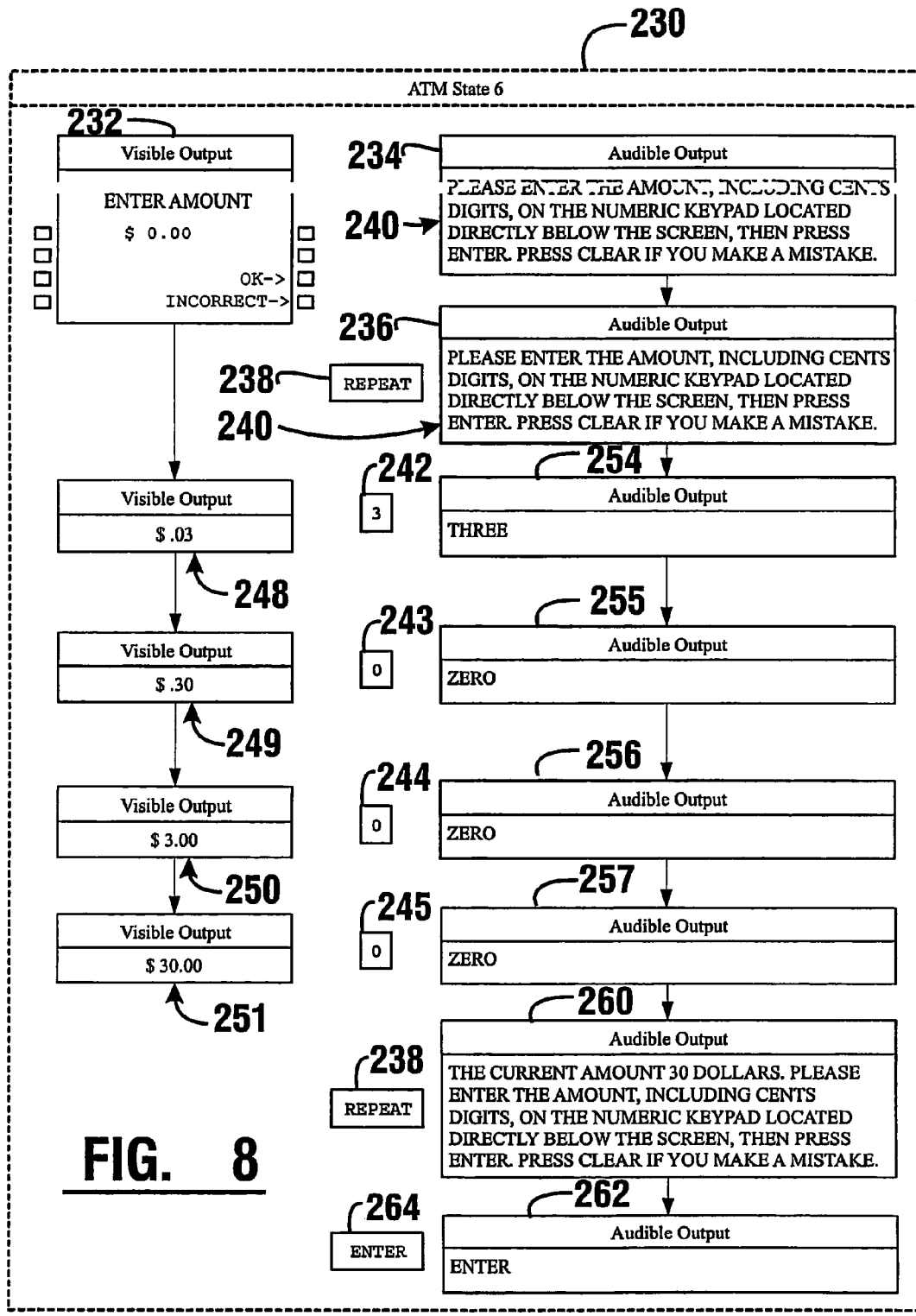

In this described exemplary embodiment, the five "5" key 218 corresponds to the selection of another amount for a withdrawal. When this key is pressed, while the ATM is in the fifth state, the ATM is operative to cause the ATM to change to a sixth state and is operative to produce a further audible output 220 which verbally describes this selection with a word such as "Other." As shown in FIG. 8, when the exemplary ATM is in a sixth state 230, the ATM may be operative to enable the consumer to enter a specific amount of cash to withdraw, which amount may be other than one of the predetermined amounts previously presented. Here, the ATM may be operative to produce a visible output 232 which requests that the consumer enter an amount for the withdrawal in a currency such as dollars. The exemplary ATM may further be operative to produce an audible output 234 which verbally requests that the consumer enter an amount which includes a fractional currency portion such as cents on the keypad.

If for some reason the consumer did not hear or understand all of the verbal instructions 240 of the audible output 234, the exemplary ATM may be operative to enable the consumer to cause the ATM to repeat the verbal instructions 240. In an exemplary embodiment, the ATM may be operative to produce a further audible output 236 which includes a repeat of the verbal instructions 240 responsive to the consumer pressing a repeat key 238 of the keypad. If the repeat key is pressed before the verbal instructions 240 in the audible output 234 have completed, the exemplary ATM may be operative to interrupt the audible output 234 and immediately begin outputting the further audible output 236. The further audible output 236 may then repeat the verbal instructions 240 from the beginning. In other exemplary embodiments, the ATM may be operative to produce further audible outputs 236 which include a repeat of the verbal instructions 240 responsive to actuation of any unused key of the keypad which is not associated with another function or a selection available in the current state of the ATM.

When the consumer enters an amount of a withdrawal by pressing the number keys 242-245, the exemplary embodiment of the ATM may be operative to update the visible output 232 to produce visual outputs 248-251 with indicia representative of the current amount entered. In addition the ATM may be operative to produce further audible outputs 254-257 which verbally describe the number associated with the key that was pressed. In the exemplary embodiment, as each key is pressed, the ATM may be operative to determine a new current amount of value. The last two keys pressed may correspond to the fractional portion of the amount such as the cents portion in U.S. currency. The current amount may be stored in a memory or buffer in operative connection with the computer of the ATM. Pressing the repeat key 238 while a withdrawal amount has been or is being entered, may cause the ATM to produce a further audible output 260 which verbally indicates the current amount stored in the memory of the ATM. In an exemplary embodiment, the audible output 260 may also include a repeat of the verbal instructions 240.

Figure 9:
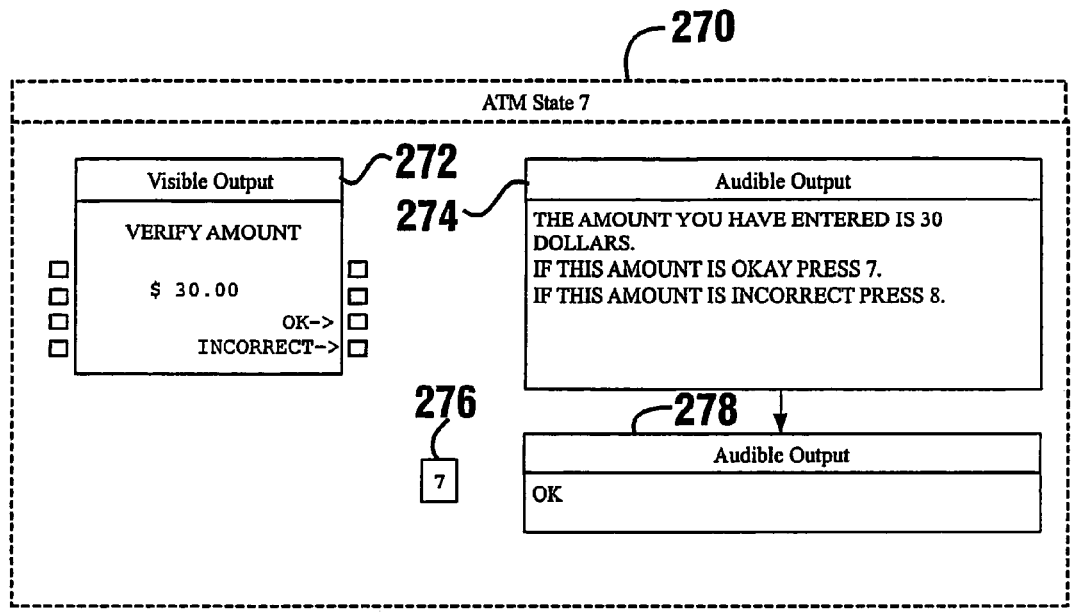

When the consumer has completed entering an amount, the consumer may press the enter key 264. Pressing the enter key may cause the ATM to change to a seventh state and produce another audible output 262 which verbally describes that the enter key has been pressed. FIG. 9 represents the ATM in a seventh state 270. Here, the exemplary embodiment of the ATM may be operative to produce a visible output 272 which requests that the consumer verify that the amount entered in the preceding state is correct. The ATM may also be operative to produce an audible output 274 which verbally indicates the current amount entered and requests that the consumer press keys of the keypad to verify that the amount is either correct or incorrect. In this described exemplary embodiment, the consumer may verify the amount by pressing the seven "7" key 276 of the keypad. When the seven "7" key is pressed, the ATM may be operative to produce an audible output 278 that verbally indicates a description of the selection by outputting a word such as "OK."

Figure 10:
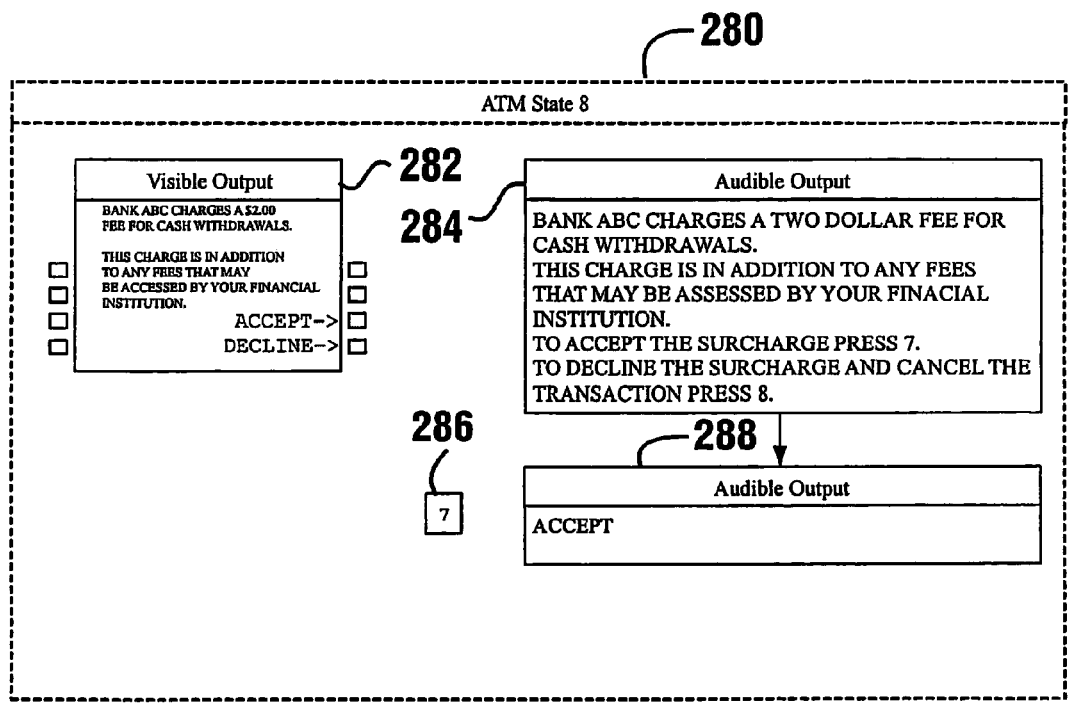

Once an amount has been verified by the consumer, if the ATM is configured to charge a surcharge for the transaction, the ATM may change to a further state such as the eighth state 280 shown in FIG. 10. Here, the exemplary ATM may be operative to produce a visible output 282 which discloses the fee for the withdrawal and requests that the user accept or decline the surcharge. The ATM may further be operative to produce an audible output 284 which verbally describes the fee and indicates which keys of the keypad may be pressed in order to accept or decline the surcharge.

Figure 11:
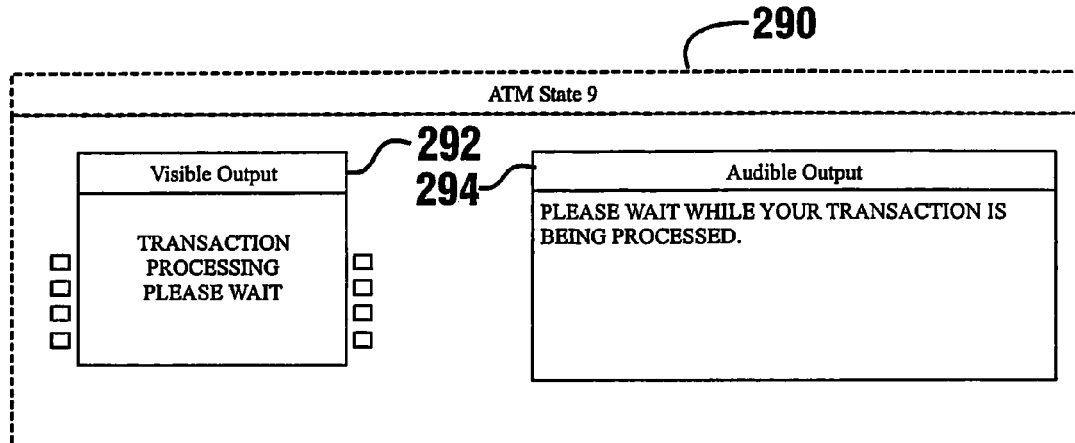
Figure 12:
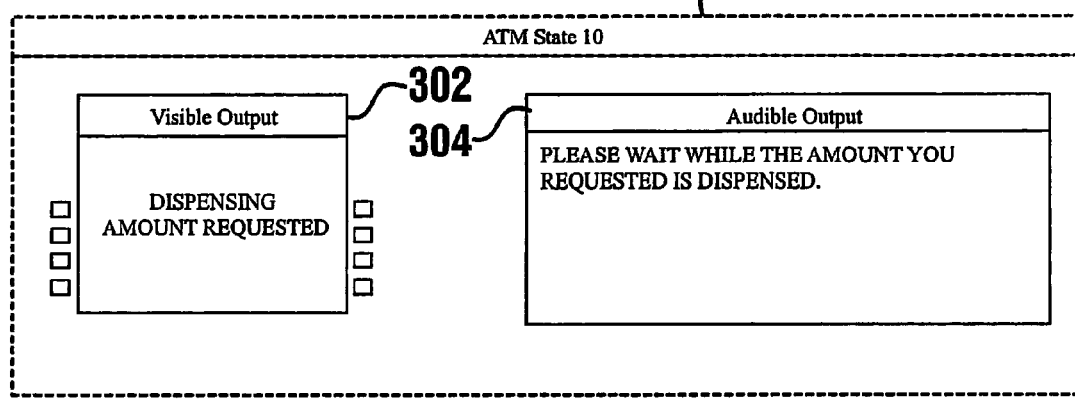

If the consumer accepts the charge by pressing the seven "7" key 286 for example, the ATM may be operative to produce the further audible output 288 which verbally indicates that the user has accepted the surcharge by outputting a word such as "Accept." Once a consumer has accepted the surcharge (if applicable for the transaction), the exemplary ATM may be operative to change to a ninth state 290 represented in FIG. 11 in which the ATM produces both a visible output 292 and an audible output 294 which indicates that the transaction is being processed. Once the withdrawal has been authorized, the ATM may be operative to change to a tenth state 300 represented in FIG. 12. In this state the exemplary embodiment of the ATM may produce both a visible output 302 and an audible output 304 which indicate that the ATM is in the process of dispensing the requested amount.

Figure 13:
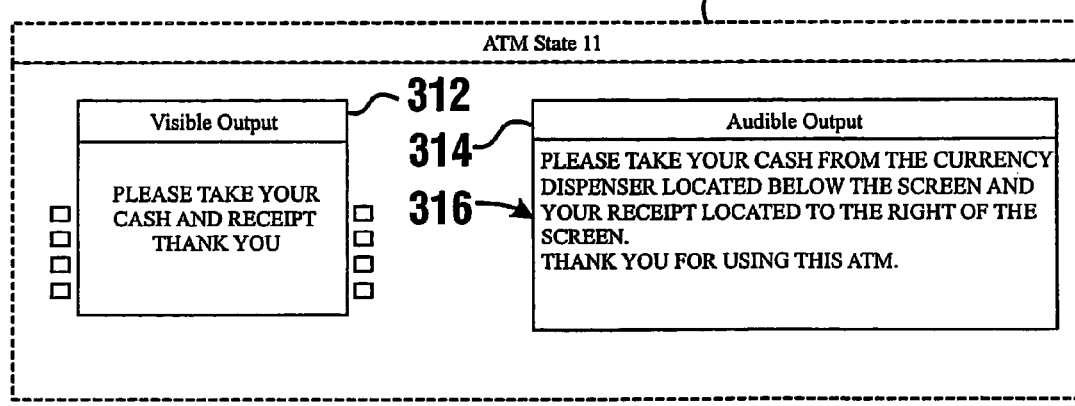

Once the exemplary embodiment of the ATM has dispensed an amount of cash with the cash dispenser that corresponds to the requested amount, the ATM may be operative to change to an eleventh state 310 as represented in FIG. 13. In the eleventh state the ATM may be operative to produce both a visible output 312 and an audible output 314 which indicate that the consumer may take the dispensed amount of cash and a receipt from the ATM. In addition, the verbal instructions 316 of the audible output may further describe the locations of the opening through which cash is delivered and the opening through which a receipt is delivered on the ATM.

Once the transaction function has been completed, the exemplary embodiment of the ATM may return to a previous state such as the described third state 160 shown in FIG. 5 for selecting another transaction or the described first state 102 shown in FIG. 3 for attracting new consumers. It is to be understood that the described ATM states, visible outputs, and audible outputs are examples of performing only one type of transaction with the exemplary embodiment. Other transaction functions for the described ATM and alternative exemplary embodiments of the ATM may have additional and/or other types of ATM states, visible outputs, and audible outputs.

In some exemplary embodiments, pre-existing ATMs which do not offer a user interface for the visually impaired may be upgraded to include some or all of the previously described features. Such an upgrade may include installing new terminal control software that is operative to cause the computer to direct the previously described audible outputs through a sound system device of the ATM. Such upgraded terminal control software may further be operative to cause the ATM to repeat verbal instructions, provide verbal help for selections, and/or change the volume of the audible output as described previously.

Figure 14:
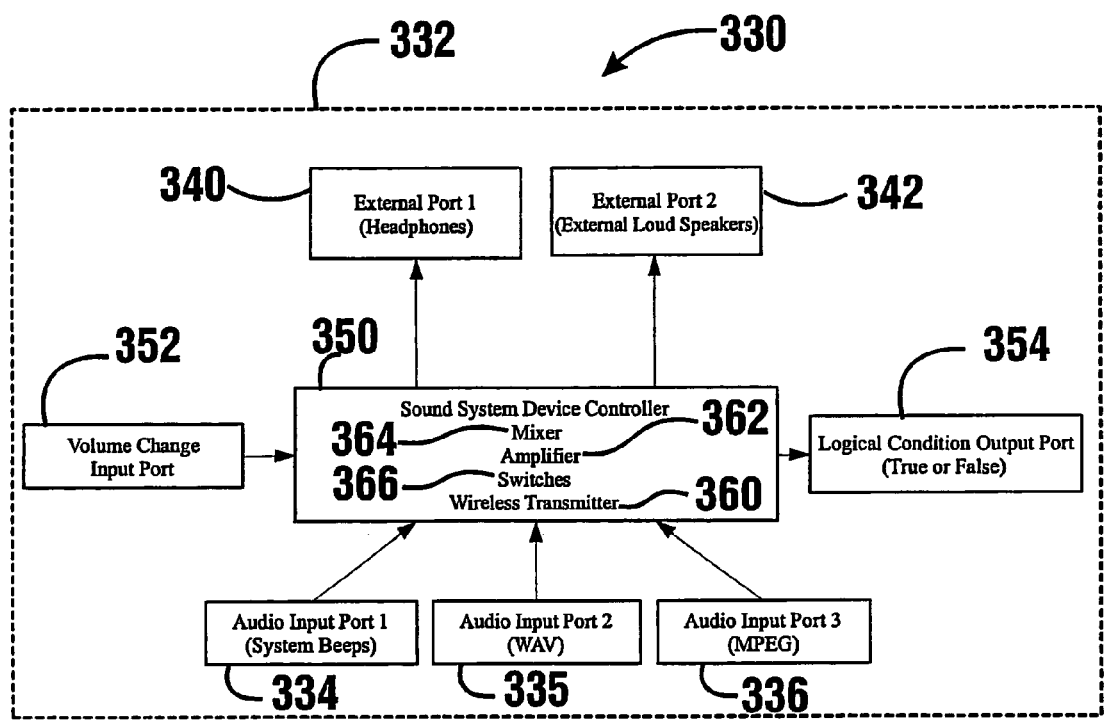
FIG. 14 is a schematic view representative of an exemplary audio system.

In addition, such an upgrade of a pre-existing ATM may include the installation of an audio system that is operative to further enable an ATM to have some or all of the previously described features. FIG. 14 shows an example of an audio system 330 which is adapted to provide an ATM with support for headphones 340 using an exemplary embodiment of a sound system device 332. The sound system device 332 may be adapted to accept one or more audio signals through audio input ports 334-336. Such input ports may be connected to the output ports of one or more audio output devices of the ATM. For example, such audio output devices of an ATM may include a sound card that is operative responsive to operation of the computer associated with the ATM to produce sound signals from WAV or MP3 files. In addition, the ATM may include audio output devices for generating audio signals with beeps and other prompting sounds to assist a consumer in operating the ATM. Also, the exemplary ATM may include a text-to-speech synthesizer audio output device and/or software which is operative to produce audio signals with verbal instructions responsive to alphanumeric text-based instructions included in visual display outputs.

The exemplary sound system device 332 may include a controller 350 that is operative to manipulate one or more audio signals individually through the audio input ports 334-336. The controller 350 may include an amplifier 362 and mixing circuits 364 which are operative to selectively amplify and mix the audio input signals together to produce one or more amplified audio signals. Such amplified audio signals may be selectively directed by the controller 350 through one or more of the external ports 340, 342 of the sound system device. In an exemplary embodiment, the external ports 340, 342 correspond to speaker ports that are adapted to releasably connect to headphones and external loudspeakers. In the exemplary embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an exemplary embodiment of the sound system device 332, the controller may be in operative connection with a volume change input port 352. The volume change input port 352 may be operative to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operative to amplify the amplified audio signals responsive to the currently selected volume level. When the volume level reaches a maximum level, the exemplary controller may be operative to change the volume level to a predetermined minimum level responsive to the next electrical signal received from operation of the volume control.

In this described exemplary embodiment, the ATM may include a volume control such as a button adjacent the keypad which is in operative connection with the volume change input port 352 of the sound system device 332. However, in other exemplary embodiments, the controller may be operative to receive volume changing signals from the computer of the ATM. Terminal control software may be configured to detect events such as the pressing of a pound "#" key of the keypad and cause the computer to output a volume changing signal to the sound system device.

As discussed previously, the sound system device may be operative to mute amplified audio signals being directed through the external port 342 for external loudspeakers, responsive to the sound system device detecting the connection of headphones to the external port 340 for headphones. In an exemplary embodiment the controller 350 may be operatively configured to detect the impedance change across the external port 340 when headphones are electrically connected to the external port. In the exemplary embodiment, when the connection is detected the controller 350 may be operative to switch off any amplified audio signals being directed to the external port 342 for the external loudspeakers.

In addition, upon detection of the connection of the headphones the controller 350 may be operative to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume level that is loud enough to be capable of being heard by almost all consumers, but is sufficiently low to be unlikely to cause discomfort to the majority of consumers using headphones with an ATM.

In the exemplary embodiment, the controller may further be operative to detect when the headphone has been disconnected from the external port 340 for the headphones. When this occurs the controller may be operative to mute the amplified audio signals to the external port 340 for the headphone and institute the delivery of amplified audio signals to the external port 342 for external loudspeakers.

Also, in the exemplary embodiment, the controller 350 may be in operative connection with a logical condition output port 354 that is adapted to communicate with the computer. The controller 350 may be operative responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operative to set the logical condition output port 354 to an electrical condition representative of false or off.

In the exemplary embodiment, the computer of the ATM may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, the exemplary ATM may be configured to output system beeps and other prompting sounds through the external loudspeakers. However, when headphones are connected and the condition of the logical condition output port 354 changes to true or on, the exemplary terminal control software may be programmed to begin producing audio output with verbal instructions for operating the machine which is directed to the headphones.

In further alternative exemplary embodiments, the sound system device may further include a wireless transmitter 360. Such a transmitter may be operatively configured to transmit a wireless audio signal through an external port of the sound system device. Such a wireless audio signal may be received by a wireless receiver of the consumer such as wireless headphones or other suitable external device usable by the consumer for receiving outputs from the ATM.

In alternative embodiments, the wireless audio signal may be encrypted by the ATM to minimize possible eavesdropping on the transaction by a third party. Such encryption may include a handshaking protocol between the ATM and the headphones or other wireless receiver device of the consumer which verifies that the consumer currently accessing the ATM is the only party that can decipher the audio signals in the wireless transmission from the ATM. For example, in one exemplary embodiment, wireless audio signals between the headphones and the ATM may be transmitted using wireless network technology such as BlueTooth or IEEE 802.11. In such embodiments, the ATM may output to each consumer within range of the ATM a verbal message which includes a unique session code. When the consumer has access to the machine, the consumer can enter their unique access code before entering a PIN. Based on the unique access code entered, the ATM may then direct the audio signals related to operating the ATM only to the set of wireless headphones which originally received the access code from the ATM.

In further exemplary embodiments, the ATM may be configured to direct private wireless audio signals to the headphones or other receiver device of the consumer based on information retrieved from the card or other input used to access the ATM by the consumer. For example, each information from or correlated with data on the card or other input may enable the ATM to retrieve or determine a private network address, encryption key, digital certificate, or other information associated with the headphones of the consumer, which may be used by the ATM to establish secure and private communications with head phones or other wireless devices of the consumer.

In further alternative exemplary embodiments, the handshaking protocol between the ATM and the wireless headphones or other receiving device used by the consumer may be based on a biometric input received from the consumer currently accessing the ATM. Such biometric input for example may include a fingerprint scan, facial recognition system or other biometric scan of the consumer. The ATM may then selectively send private wireless audio signals only to that set of headphones which is operatively configured with information that corresponds to the biometric input corresponding to the particular user.

As discussed previously, exemplary embodiments of automated banking machines such as ATMs may output verbal instructions in response to alphanumeric text messages 54. Such ATMs may include a text-to-speech device 62 and/or text-to-speech software which is operative to convert the alphanumeric text messages 54 to verbal audible outputs. As discussed previously, such alphanumeric text messages 54 are also referred to herein as text-to-speech data.

The text-to-speech data may be stored in a local data store of the machine. For example, in one exemplary embodiment, text-to-speech data may be included in one or more files stored on a hard drive of the machine. One or more of the text-to-speech files may be associated with visual screen data 52 also stored on the machine for use with generating visual outputs through the display device of the machine. In exemplary embodiments, screen data 52 may specify which text-to-speech files to access for use with generating audible outputs during the display of the visual outputs.

In exemplary embodiments, the text-to-speech data may be transferred to the machine from a remote server such as a host banking system. Although, in exemplary embodiments, host banking system software may be updated to accommodate the transfer of text-to-speech data to ATMs, alternative exemplary embodiments may include an alternative method of using existing or legacy host banking systems to transfer text-to-speech data to an ATM. Such a method may include providing monitoring software on the ATM which is capable of detecting and retrieving text-to-speech data from legacy messages originally designed for other types of ATM configuration data.

For example, legacy ATM protocols such as Diebold 91x may include messages which are operative to transfer screen data to ATMs from a host banking system. Such legacy protocols for transferring screen data may include attributes which are associated with or are used to label the screen data being transferred using the protocol. Examples of such attributes associated with screen data messages may include a screen name/number and a bank number.

An exemplary embodiment of the described monitoring software may be operative to monitor one or more of such attributes in the screen data messages. Screen data messages which include text-to-speech data may include predefined values for one or more of these attributes which the monitoring software is operative to recognize as indicating that the screen data message includes text-to-speech data. When such predefined attributes are detected the monitoring software is operative to read the text-to-speech data from the screen data messages and store the text-to-speech data on the machine.

In an exemplary embodiment the attributes used to indicate the presence of text-to-speech data in the screen data messages may also be used to specify, label, or describe features of the text-to-speech data. For example the attributes may be used to identify the human language associated with the textto-speech data (e.g. English or Spanish). Such attributes may also provide information usable by the monitoring software to label or name the text-to-speech data.

For example, the following data may be included in a screen data message sent to an automated banking machine from a host banking system:

015 900 [E]_000 Please select your transaction. For a withdrawal press 1. To make a deposit, press 2. To transfer money, press 3

An exemplary embodiment of the monitoring software may be operative to monitor the attribute associated with the bank number for values which indicate that the screen data message includes text-to-speech data. In this described exemplary embodiment, bank numbers greater than or equal to 900 are used to specify that text-to-speech data is present in the message. When bank numbers greater than or equal to 900 are detected by the monitoring software, the monitoring software may be operative to use the information provided in the screen data message to generate a text-to-speech file.

In an exemplary embodiment, the text-to-speech file generated may be placed in a predetermined and/or configurable directory on the machine. In other exemplary embodiments, the text-to-speech file may be placed in a directory specified by the screen data in the message. For example, in an exemplary embodiment the bank number may be used to specify a name of a directory on the hard drive of the machine to store the text-to-speech file. Each directory may correspond to a different human language, so that all text-to-speech files stored in a particular directory correspond to the same human language.

In the above example, the screen data message includes the bank number of 900. In exemplary embodiments, a bank number with a value of 900 may correspond to a human language such as English. Also, in such exemplary embodiments, a bank number with a value of 901 may correspond to another human language such as Spanish.

When the screen data is associated with the bank number with the value of 900, the monitoring software may be operative to generate and store a corresponding text-to-speech file in a directory reserved for English language text-to-speech files. Whereas, when the screen data is associated with the bank number with the value of 901, the monitoring software may be operative to generate and store a corresponding text-to-speech file in a directory reserved for Spanish language text-to-speech files.

In one exemplary embodiment, the text-to-speech directories may include names which correspond to all or portions of the bank number or other attribute which are used to specify the human language of the text-to-speech data. For example, text-to-speech files may be placed in a directory with a name that corresponds to one or more of the digits of its associated bank number. Thus text-to-speech files associated with the bank number of 900 may be placed in a directory with a name such as "lang000," while text-to-speech files associated with the bank number of 901 may be placed in a directory with a name such as "lang001." Likewise, text-to-speech files associated with the bank number of 902 may be placed in a directory with a name such as "lang002." In this described exemplary embodiment, one or more of the digits or other characters which distinguish between the different bank numbers or other attributes may be used in the name of corresponding directories used to store the text-to-speech files.

In exemplary embodiments, other data or attributes associated with the screen data message may be used by the monitoring software to generate a name for the generated text-to-speech file. For example, in the above example, the screen data message includes a screen name attribute with a value of "015." This screen name may be included in the name of the generated text-to-speech file. Also, in the above example, the screen data following the bank number includes a letter "E" in brackets. The monitoring software may also be operative to identify the letter between the brackets following the bank number and use the identified letter in the name of the file.

As a result, the corresponding file name generated by the monitoring software from the above example of a screen data message may include the characters "E015." In exemplary embodiments, the monitoring software may include other characters in the file names such as a descriptive prefix and extensions. In one exemplary embodiment, generated text-to-speech files include a prefix such as "TT" and an extension such as "htm." For the above example of screen data, the corresponding text-to-speech file name would be "TTE015.htm."

In exemplary embodiments, the monitoring software may be operative to generate text-to-speech files which include HTML tags, Java script, VB script, XML, and/or other code which is operative to cause the ATM to generate audible outputs responsive to the text-to-speech data stored in the file. For example, in the above example, the screen data following the brackets may correspond to text-to-speech data. The monitoring software may be operative to place this text-to speech data in an HTM file along with HTM tags, Java script and/or other interpreted code which is operative to cause the ATM to process the text-to-speech data with text-to-speech devices 62 and/or software on the machine.

In one exemplary embodiment, the HTM text-to-speech file may reference an Active X control or other external software. The ATM may include a browser or other HTML responsive software which is operative to read the HTM text-to-speech file and in response to the file access and/or send the screen data as an argument to an ActiveX control. The ActiveX control may be programmed to accesses and/or cause the text-to-speech device or software of the ATM to convert the text-to-speech data to corresponding audible outputs.

In the above example, the text-to-speech device and/or software would output verbal instructions representative of the spoken command "Please select your transaction. For a withdrawal press 1. To make a deposit, press 2. To transfer money, press 3."

In an exemplary embodiment, the text-to-speech data may include additional attributes which are not intended to be spoken but are intended to configure the operation of the text-to-speech device and/or software. In the above example, the screen data begins with the four characters "_000." The text-to-speech device and/or software may be responsive to these characters to determine which human language to use when generating verbal instructions from the text-to-speech data. For example, the beginning characters "_000" may correspond to the human language English. As a result, the text-to-speech device and/or software may convert the subsequent text-to-speech data to audible outputs which correspond to an English pronunciation of the text-to-speech data.

In the exemplary embodiment, the terminal control software of the machine may be operative to access the text-to-speech files responsive to screen data files. Thus, when the ATM produces a visual output responsive to a particular screen data file, the screen file may reference an associated text-to-speech file which describes the features of the visual output.

With the above described exemplary embodiment, both visual screen data and associated text-to-speech data can be updated on an ATM using standard or legacy ATM protocols and messages from a host banking system. In addition, for each state of an ATM, screen data and associated text-to-speech data may be downloaded to the computer in the ATM in multiple languages. Depending on the language preference of the user operating the machine, terminal control software in the ATM is operative to access the screen data and text-to-speech data which corresponds to the language preferred by the user.

In further exemplary embodiments, the monitoring software may be operative to monitor screen messages for the presence of screen data and responsive thereto, save the screen data in an ASCII text format or other format in a single display screen file on the hard drive of the ATM. Further, the monitoring software may be operative to monitor for the presence of state messages from a host banking system. The monitoring software may be operative responsive to the detection of state message to retrieve state information from the messages and store the state information in a single state file.

In further exemplary embodiments, the monitoring software may be operative to store screen data that comes from a host banking machine in a Diebold® open account relationship (OAR) message or as part of a screen update data field in a function command message.

In exemplary embodiments, HTML code accessible to the ATM for generating user interfaces for operating the ATM may include the use of the "^" symbol or other symbol or tag which causes an HTML responsive program (such as a browser) to access one of the described text-to-speech, display screen, or state files generated by the monitoring software.

For example HTML code for generating a user interface may include the command ^0154. The "^" symbol may be detected by browser accessing the HTML code and in response thereto the browser may access a text-to-speech file such as "TTS154.TXT" from the appropriate language director such as lang000. The text-to-speech file "TTS154.TXT" may have been created by the monitoring software responsive to a screen message as discussed previously. In another example, the "^" or other symbol or tag may reference a display screen file generated using the monitoring software such as the display screen file "SCR035.txt." The data from the display screen file may be incorporated into a visual display screen generated by the ATM. By referencing such text-to-speech, visual display screen, or state files from HTML code, the ATM can be dynamically updated to display visual or to output audible information representative of different surcharge amounts, or low bill denominations without having to alter the programming of the host system software.

A further exemplary embodiment may include a sound configuration software component which is operative to aid a technician with the process of configuring an ATM to provide audible outputs with verbal instruction. In one exemplary embodiment, the sound configuration software may be located on a portable medium such as a CD/DVD disk or other storage medium. The portable medium may be placed in a corresponding reading device of the ATM (e.g. CD/DVD reader) and the sound configuration software may be executed from the portable medium.

In an exemplary embodiment, the sound configuration software may be operative to configure and/or update an ATM to include sound software and/or data necessary to enable the ATM to generate audible outputs with verbal instructions. Such sound software may include text-to-speech synthesizer software, the previously described monitoring software, and/or any other sound system related software or data.

The sound configuration software may also be operative to copy from the portable medium verbal instruction data (e.g., text-to-speech files, WAV files, and/or MP3 files) which corresponds to display screens provided by the ATM which are not typically retrieved from a host. For example, ATMs may include an off-line screen if the ATM is powered on without having a communication connection with a host banking system. ATMs may also include an out of service screen if they have communication with the host established but have not received screen messages from the host. ATMs may also include screens to handle situations where a transaction will require a particular device which is currently being serviced or where the device requires interaction with the user. For these described screens, the sound configuration software may be operative to copy from the portable medium verbal instruction data to the ATM which is operative to cause the ATM to generate audible outputs which verbally describe for these screens.

In addition, manufacturers of ATMs often produce many different models of ATMs with different physical shapes and sizes. Different models may have the display screen, keypad, cash dispenser, and other devices positioned in different locations with respect to each other. Further, even for the same model of ATM, the positions of some devices may be located in a plurality of different positions depending on the preferences of the owner and/or operator of the ATM.

Because the audible outputs from the ATM may include verbal instructions which describe the location of the devices on the ATM, different ATMs may require verbal instruction data which is customized to the physical configuration of the ATM.

In this described exemplary embodiment, the sound configuration software may cause the computer of the ATM to output a tutorial which prompts the technician to input information representative of what devices are installed on the ATM and/or where on the ATM the devices are located. For example, not all ATMs include a depository mechanism or coin dispenser. Thus, an exemplary embodiment of the sound configuration software may query the technician to determine whether a depository mechanism or a particular type of cash dispenser, such as a coin dispenser is present. If a depositary mechanism is determined by the configuration software to be present, the sound configuration software may further query the technician to determine the location of the depositary mechanism relative a fixed point such as the screen or other landmark on the ATM.

In exemplary embodiments, the sound configuration software may further query the technician as to the type of devices installed on the ATM. For example, ATMs may include different types of card readers such as a motorized internal reader, swipe reader, vertical DIP reader, or horizontal DIP reader. An exemplary embodiment of the sound configuration software may be operative to prompt the technician to select which type of card reader is installed.

Based on the answers provided by the technician, the sound configuration software may copy data files from the portable medium to the hard drive of the ATM which are operative to correctly configure the ATM to provide audible outputs customized to the physical configuration of the ATM. As a result, after the sound configuration software has configured the ATM, the ATM may be operative to provide audible outputs with verbal instructions which accurately describe the locations of devices (e.g., "to the right of the monitor") and their method of use (e.g., "insert card" or "swipe card vertically").

In an exemplary embodiment, the answers provided by the technician associated with the location and/or type of devices installed on the ATM may be stored in a data store on the ATM. A tutorial included with the sound configuration software may present configuration options for the sound software being configured responsive to the data in this data store. In exemplary embodiments, this data store may remain on the hard drive of the ATM. Thus the next time the sound configuration software is executed from the portable medium, the tutorial may proceed using the data provided by the technician previously rather than forcing the technician to re-answer each question regarding the location and/or type of devices on the ATM. However, exemplary embodiments of the sound configuration software may also enable the technician to update the data stored in the data store as needed.

In further exemplary embodiments, the portable medium may be customized for different customers of the manufacturer of the ATMs. For example, a customer may have a relatively small set of combinations of ATM models and associated devices. For this customer, a custom portable medium may be created which includes sound configuration software which prompts the user with questions specific to the range of ATM models and associated devices the customer is expected to have. Thus, if the customer only has motorized internal type card readers, the sound configuration software on the customer specific portable medium may be operative to not prompt the technician as to the type of card reader installed on the ATM. Further, the customer specific portable medium may include audible output data which generates audible outputs specific to the customer. For example, a text-to-speech file associated with a welcome screen of the ATM may include the name of the customer (e.g., "Welcome to Bank XYZ").

Figure 15:
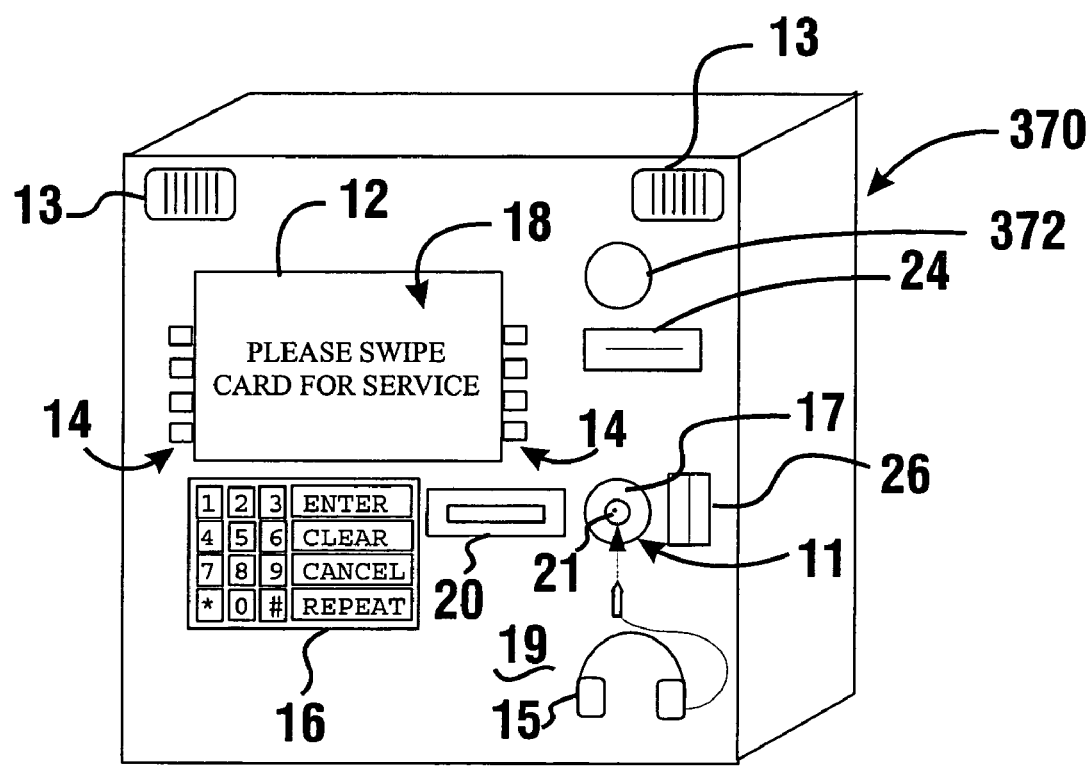
FIG. 15 is a perspective view of an alternative exemplary embodiment including an alternative user interface.

An alternative embodiment of an ATM 370, shown in FIG. 15, includes alternative ways for users of the machine to provide inputs thereto for purposes of conducting transactions. ATM 370 is generally similar to ATM 10 previously described, except as specifically indicated. ATM 370 includes an item 372 which is movably mounted in supporting connection with the ATM. In the exemplary embodiment, item 372 comprises a movable member comprising a knob which is rotatable about its central axis and which is also movable axially by a consumer operating the ATM. It should be understood, however, that knob 372 is exemplary of many different types of items and movable members which may be used in certain embodiments.

In the exemplary embodiment, the knob 372 is in operative connection with one or more computers in the ATM. In addition, in the exemplary embodiment, the knob is operatively connected to an encoder for indicating rotational position, at least one switch for sensing axial movement, and at least one solenoid and brake device. Of course these devices are exemplary and other or different device types may be used. These devices are operatively connected to the computer for purposes of indicating to the computer the rotational and axial positions of the knob. In addition, solenoid and brake devices are operative to provide outputs which can be manually perceived by a user who is touching the knob. Such perceptible outputs may include, for example, perceived vibratory "clicks" as the knob is rotated through angular position increments. In addition, the brake mechanism may be used to limit rotational travel of the knob and/or to provide changes in the resistance to rotation that a user encounters in rotating the knob. Such changes in perceptible vibratory properties as well as rotational displacement may be used to facilitate receiving user selections in a manner later described.

In the exemplary embodiment, the knob 372 does not include position marking such as gradation or scale markings thereon, or any such indicators adjacent thereto. This is done in the exemplary embodiment to facilitate the multi-function purposes served by the knob 372, as well as to reduce the risk of the interception of inputs that a user may provide through the knob.

In exemplary ATM 370, the knob 372 can be used as a substitute for the keypad and/or function keys on the ATM. The knob 372 may be used by blind users who operate the machine through voice guidance. Alternatively, the knob 372 may be used by sighted users who could otherwise operate the machine through manual inputs to other input devices. In some embodiments, the ATM 370 may be provided with audible output devices such as speakers, headphones, or a handset so that users who do not bring their own audio listening devices to the machine are nonetheless able to operate the machine in response to audible outputs generated responsive to the computer in the machine. Alternatively in some embodiments, the outputs from the machine may be provided through RF, IR, or other signals which are transmitted and which can be perceived by the user through the use of a suitable receiving device.

In operation of the exemplary ATM 370, a user inserts their card such as a debit or credit card into the card reader 26 so that indicia on the card is read through operation of the machine. As previously discussed, the user may be prompted to insert their card into the slot visual outputs through the display and/or by audible outputs through speakers, headphone, or handset. In addition, the ATM may operate responsive to the programming of the computer to advise the user as to the location of the card reader slot relative to the other components of the machine.

In the exemplary embodiment, responsive to the machine reading the card, the machine operates in accordance with the programming of the computer to indicate to the user that they must enter a multicharacter code such as a PIN number. In the exemplary embodiment the multicharacter code may comprise a plurality of letters and/or digits. It should be understood that for purposes of this disclosure the characters refer to letters, digits, numbers or other distinguishing symbols or items that can be components of a code.

In the exemplary embodiment, the user may be advised that they can input their code through the keypad, or alternatively through the knob 372. The user may be instructed as to the location of the knob relative to the card reader or other devices on the machine. The user may also be instructed through audible and/or outputs to indicate that they wish to use the knob to provide selections by pushing inwardly on the knob or otherwise taking some distinct action with regard to the knob or other input device on the machine.

In the exemplary embodiment the user pushes inwardly on the knob, at least one signal is generated by the attached switch and is received by the computer indicating that the user has chosen to use the movable knob to provide selections. Responsive to this signal, the computer operates in accordance with its programming to provide audible and/or visual outputs indicating to the user that they should rotate the knob until the particular character that makes up their PIN is output audibly by the machine, and that once the knob is moved to a position corresponding to the correct character, they should so indicate by pressing inward on the knob. In addition, the user is instructed that the current rotational position of the knob corresponds to a particular character, such as a particular digit, and that to select higher digits the user should turn the knob in a first rotational direction, and to select lower digits the knob should be turned in the opposite rotational direction. Further, in this exemplary embodiment, the user is instructed that if they wish to input a code that includes letters rather than digits, they should pull outward on the knob. If the user pulls outward, audible instructions are provided indicating that the current position of the knob corresponds to a particular letter and to move higher in the alphabet the knob should be turned in a first rotational direction, and to move lower in the alphabet the knob should be turned in the opposite rotational direction. The user is further instructed that when the desired letter which makes up their code is heard, they should press on the knob.

The user, responsive to the audible instructions, rotates the knob as appropriate from the indicated starting position through a plurality of rotational positions until the character corresponding to the first character of their PIN is audibly output. In an exemplary embodiment, the solenoid operates to provide a manually perceptible vibratory "click" as the knob is moved to each angular position, which causes the computer to output the audible indication of the next character. This facilitates the user rotating the knob in a manner to quickly rotate the knob through a plurality of positions and to reach the desired character. Further in an exemplary embodiment, the computer may operate so as to cause the brake that is operatively connected to the knob to stop the knob's rotation when it has reached the end of the suitable range of values which can be input. Alternatively in other embodiments, the computer may operate to provide the user with a perceptible "bump" or other vibratory or other tactile feature as the end of the range is reached, but may enable the user to continue turning the knob such that the next subsequent position is at the lowest end of the range. Of course, these approaches are exemplary, and in other embodiments other approaches may be used.

In the exemplary embodiment when the user has rotated the knob through a plurality of positions such that the audible output corresponds to the first character of their PIN, the user presses inwardly on the knob. The signal produced by the switch in operative connection with the knob sends at least one signal to the computer indicating that the user has input the first character of their PIN. Responsive to this input, the computer operates in accordance with its programming to audibly indicate to the user that the ATM has received the first character of their PIN and indicates what it is, and that they should now input the second character in the same manner.

Thereafter the computer causes an audible output to be provided, indicating a character corresponding to the current location of the knob, which in the exemplary embodiment is different from the character that the user has selected. The user then can rotate the knob through a plurality of positions until the second character of the PIN is output audibly to the user, and the user selects the second character of the PIN by pressing on the knob. The machine then operates in accordance with its programming and in response to the user selecting the second character of their PIN to indicate that it has received the second input, indicate what it is, and to provide further instructions to input the third character of the PIN. Thereafter the ATM provides an audible output indicating the character corresponding to the then-current rotational position of the knob. This process is repeated until all the characters of the customer's PIN have been input.

In some exemplary embodiments, the computer is operative to select the character corresponding to the then-current position of the knob randomly. In this way, a criminal seeking to uncover the user's PIN number will not know the starting character and will therefore not be able to determine the character which makes up the PIN from the observed extent of rotation of the knob. In addition, because the positions may be varied responsive to programming of the computer, the degree of rotation of the knob is also not necessarily an indication of the character that the user has selected. Further in exemplary embodiments the computer may be programmed to vary the direction that the user is instructed to turn the knob so as to go higher or lower in the range of characters. This further makes it difficult for a criminal to determine what character has been input by the user. In exemplary embodiments the characters which may be selected using a movable item such as the knob are not limited to the same extent as with the keypad. Thus for example, a customer's code or PIN number may be comprised of two-digit values. The potential combination of two-digit values makes it much more difficult for a criminal to determine a user's PIN number. Of course, these approaches are exemplary, and in other embodiments other approaches may be used.

In some exemplary embodiments it may be desirable to encrypt the communications which convey the characters which comprise the customer's PIN to the audio output device used by the user. This may include encoding the signals so that they cannot be readily intercepted by persons who may have placed a surreptitious connection at an ATM or adjacent thereto. Different approaches may be used for encrypting and decrypting these signals depending on the type of signals being used and the transport media which provides the signals between the ATM and the user's audio output device.

Alternatively in some embodiments the ATM may provide the user with an audible output that indicates the starting position for the knob but does not provide the user with any audible or other outputs that can be intercepted related to the value corresponding to the position of the knob when it is pressed or otherwise manipulated to indicate the selected digit. For example a user may be audibly instructed at the starting point for the knob is "5" and that the knob should be turned clockwise to increase the value and counterclockwise to decrease the value. The user may then count silently the number of perceived clicks from the starting position either up or down until the knob is in a position which corresponds to the user's selected PIN digit. The user can then press the knob to indicate the selection. In this way the risk of the interception of PIN information is further avoided.

In further alternative embodiments the signals which correspond to the selections of the user input through the knob may be encrypted within the internal circuitry of the ATM. In this manner the components associated with the knob may include circuitry holding or otherwise in connection with one or more encryption keys. The encryption keys may be used to encrypt the user's inputs through the knob so that the risk of interception of the customer's inputs is reduced even if a criminal should be able to obtain access to the interior of the ATM. In some embodiments the circuitry associated with the knob may be encapsulated so that any efforts to tamper with or discover the encryption keys therein results in destruction of the keys and any other sensitive data that may be stored within the circuitry associated with the knob. In still other embodiments provision may be made in the circuitry associated with the knob to securely load and/or change the encryption keys which encrypt the user inputs. This may be done for example by a method which uses public key encryption and a public and private key stored in the circuitry associated with the knob to reliably load encryption keys from a trusted source through operation of at least one computer in the ATM. Once loaded from a trusted source the encryption keys that are loaded and used to encrypt the inputs through the knob so that such inputs are less susceptible to discovery as they are passed and used within the computer or other components of the ATM. Of course these approaches are exemplary and in other embodiments other approaches may be used.

Although the exemplary embodiment is particularly described for use in connection with a blind user, alternative embodiments may also be suitable for use with sighted users. Such embodiments may provide outputs that would normally otherwise be applied audibly to a private listing device either through speakers on the machine or through visual outputs. In some cases sensitive information such as the values in a customer's PIN entry may be suppressed and the user may mentally determine the PIN input values from an indicated reference position of the knob and the number of tactile clicks that it is moved. Alternatively in some embodiments private data may be displayed on the ATM display or through another output device in a position where it is virtually impossible for a non-authorized person to observe. For example in some embodiments the characters corresponding to a current position of the knob may be output in a portion of the ATM display that is inherently blocked by a user's body. When the desired character is reached and selected the character may disappear and/or be substituted with a place holder such as a star or other symbol. Alternatively in some embodiments indicia indicating the current position of the knob may be output through display devices other than the normal ATM display. This might include for example a single character display positioned on the knob that is normally shielded by both the user's body and their hand as the knob is turned. Of course these approaches are exemplary. Other approaches that may be taken to facilitate operation of the machine to accept confidential data without the need for audible or other perceivable outputs that may be susceptible to interception.

In the exemplary ATM 370, a user is also enabled to select transaction types through manipulation of the knob 372. This is accomplished by the user being provided with audible outputs after the user has input their PIN, which indicate that the user can select a desired transaction type by rotating the knob. In the exemplary embodiment, the ATM outputs a transaction type audibly to the user and instructs the user that if this is the transaction type that they wish to conduct, to press on the knob. Alternatively, if the user wishes to select another transaction type, the user is instructed to rotate the knob until the desired transaction type is output, and then to press on the knob. In the exemplary embodiment, the user is enabled to select transactions of the types previously discussed, such as a cash withdrawal, deposit, or balance inquiry. Of course, many different transaction types are possible at ATMs.

As is the case with regard to entering the user's code, rotation of the knob to select a transaction type can be facilitated through the use of perceptible vibratory outputs such as "clicks," stops and/or changing resistance to rotation of the knob so as to guide the user to making an available transaction selection. Also in some embodiments the computer may operate to vary the rotational direction or other properties for the knob which correspond to different transactions. This may make it more difficult for a criminal observing the machine to determine what type of transaction the user plans to conduct.

In some alternative embodiments the knob or other input device may provide means for sighted users to input the type of transaction that the user would like to conduct. This may be done for example by including on the ATM display outputs which correspond to positions of the knob. Thus for example the ATM display may include icons corresponding to a number of different transaction options as the user rotates the knob. The particular transaction option corresponding to the correct knob position may be highlighted or otherwise indicated. In this way the user by rotating the knob can select any one of many possible transaction options that are indicated on the screen. Alternatively in some embodiments the outputs through the screen may be supplemented with audible outputs which indicate to the user the nature of the transaction option currently corresponding to the position of the knob. Such transaction options may be also arranged in numerous ways on the screen. This may include arcuate arrangements of indicia as previously discussed, or linear arrays of options which are highlighted as the knob is moved to different positions. In exemplary embodiments because of the numerous possible angular positions of the knob it is possible to have a large number of transaction options corresponding to different knob positions. These transaction options may in many cases correspond to a larger number of options than would be possible using the function keys that may be adjacent to an ATM display screen. Of course this approach is exemplary of approaches that may be used.

In the exemplary embodiment of ATM 370 the user is also enabled to select an amount associated with the transaction type, through movement of the knob. For example, if the user has selected a cash withdrawal as their transaction type, the computer may cause the machine to audibly output to a user instructions indicating that to select the amount of cash to be dispensed, the user should rotate the knob until the desired amount of cash is heard and then to press inwardly on the knob. In response, the user may rotate the knob through a plurality of positions with a computer audibly outputting a dollar value as the knob moves into each position until the desired amount is heard by the user. Thereafter the user presses on the knob to select the cash amount.

It should be understood that in the exemplary embodiments for other transaction types, the computer may operate in a similar manner to have the user provide amount inputs, but may also enable the user to input both dollars and cents amounts. For example, if the user is making a deposit the computer may operate to cause an audible output to be given to the user instructing them to rotate the knob until the dollar amount associated with the deposit is output, and then to press on the knob. In response to rotation of the knob and the ATM receiving the selection, the computer thereafter audibly instructs the user to rotate the knob until a numeral corresponding to the cents in the value of the deposit is output. Thereafter, the user may rotate the knob until the cents value is output, and then the user presses on the knob. Of course these approaches are exemplary, and in other embodiments other approaches may be used.

In some alternative embodiments the amount selected by a user may be indicated by outputs through the screen of the ATM. Thus for example when the user is inputting an amount the ATM may visually through the display and/or through audible outputs provide the amount. This may include in some embodiments having the user indicate successive digits which make up the amount by turning the knob. Thus for example the screen display of the ATM may begin by changing a digit corresponding to hundreds of dollars in response to a user turning the knob. The user can then press the knob to indicate the digit corresponding to the hundreds value that corresponds to the amount being input. After the hundreds value is indicated by pushing the knob, the ATM may then modify the digit corresponding to the tens value. Thereafter after the tens value is input, the user may input the ones value and cents value. Of course in some transactions it may not be appropriate for a user to input certain amounts. The programming of the at least one computer in the ATM may prevent the user from selecting the values that are not possible for the type of transaction selected. Alternatively in some embodiments an amount value may be indicated by the user turning the knob on the machine indicating increasing or decreasing amounts in response to the knob being turned. Thus for example an output through the screen and/or through an audio device may indicate a starting amount of $20 which the user can change upward in $20 increments by turning the knob in a particular direction. The user can turn the knob up or down to correspond to the desired value that the user wishes to have associated with the transaction. Again in some embodiments the indicated values may be output through the display, an audible output device or both. Of course various approaches to indicating amount values are possible depending on the ATM hardware and the type of device for inputs being used.

Returning to the discussion of the exemplary cash dispensing transaction with the ATM 370, responsive to the user indicating the value of the cash that they wish to have dispensed, the computer in the ATM is operative to send appropriate messages to the remote host computer that is capable of authorizing the transaction. In the exemplary embodiment, the messages sent to the host computer include data representative of the user's card and PIN data, as well as the fact that the user has requested a cash withdrawal transaction and the amount thereof. The host computer then checks if the card data corresponds to the PIN and if the user is authorized to make a withdrawal in the amount requested. If the host computer determines that the transaction is authorized, the host computer returns one or more messages to the ATM, indicating that the cash should be dispensed. In response thereto, the computer in the ATM operates in accordance with its programming to operate the cash dispenser so as to cause cash to be dispensed to the user. The computer in the exemplary embodiment also is operative to cause to be output to the user audible and/or visual instructions indicating that the cash has been dispensed and indicates to the user where on the user interface they should take the cash. Further in the exemplary embodiment, the computer is operative to cause the ATM to print a receipt for the user and to extend the receipt through the fascia of the ATM. Audible and/or visual instructions may be provided to the user indicating the location from which they should take their receipt.

In the exemplary cash dispensing transaction, the user is provided with audible instructions indicating that if they wish to conduct another transaction, they should press inward on the knob 372. The user is further instructed that if they do not wish to conduct another transaction, they should turn the knob until an end transaction indication is given. If the user presses inward, the ATM operates responsive to the computer to enable the user to select another transaction type and amount in the manner previously discussed. If the user chooses not to conduct another transaction, the computer is operative to return the card to the user, the user is instructed to take the card, and the ATM gives an audible indication of the location on the fascia from which the card may be taken. Of course, these approaches are exemplary and in other embodiments other approaches may be used.

In addition, the exemplary knob 372 interface may also be used to carry out other functions of the types previously discussed. For example, the computer may be programmed so as to provide audible outputs to the user indicating that they can increase or decrease the volume of the audible outputs by rotating the knob, or alternatively, moving the knob axially. In this way the user is enabled to set the volume of the audible outputs to their desired level. Alternatively or in addition, the computer may be programmed to instruct the user that they can change the language of the outputs by providing selections through movement of the knob 372. Numerous types of selections may be provided to the user through use of an interface of this type. In addition it should be understood that the computer may be programmed so as to enable a user to provide different inputs through different types of input devices. For example, a user may provide certain selections to the ATM through use of the knob, while other inputs are provided through the keypad or other input devices. Likewise various outputs may be made from the ATM visually and/or audibly depending on the nature of the transaction and/or whether the transaction is being conducted by a sighted or blind user.

A further useful aspect of some embodiments which use a movable item as an input device is that it may reduce the ability of criminals to electronically intercept user inputs to the machine. For example, keypads sometimes produce distinctive signals indicative of the keys pressed. In some cases these signals can be intercepted by criminals who have access to the interior of the machine. Alternatively, some criminals may place a false keypad in overlying relation of the normal keypad on the machine. This false keypad can be used to intercept user inputs. By using a movable item as the input device, the risk of interception may be reduced. This is because the character value or instruction associated with the position to which the user has moved the knob or other item, is produced by operation of the computer itself. The interception of signals indicating rotation of the knob does not indicate the particular character. Further, it is much more difficult to place an interception device in connection with a movable item on the ATM fascia, such as a knob. However, even if it were possible to do this, interception concerning movement of the knob or other item does not provide the criminal with an indication of the characters that the consumer has input. In this manner, greater security for the code by ATM users may be achieved. Alternatively as previously discussed the knob or other movable device used in some embodiments may be associated with an electronic circuitry or other suitable device which encrypts the outputs from the module so as to further reduce the risk of interception. Various approaches may be taken depending on the nature of the input device and the security needs under the particular circumstances.

Figure 16:
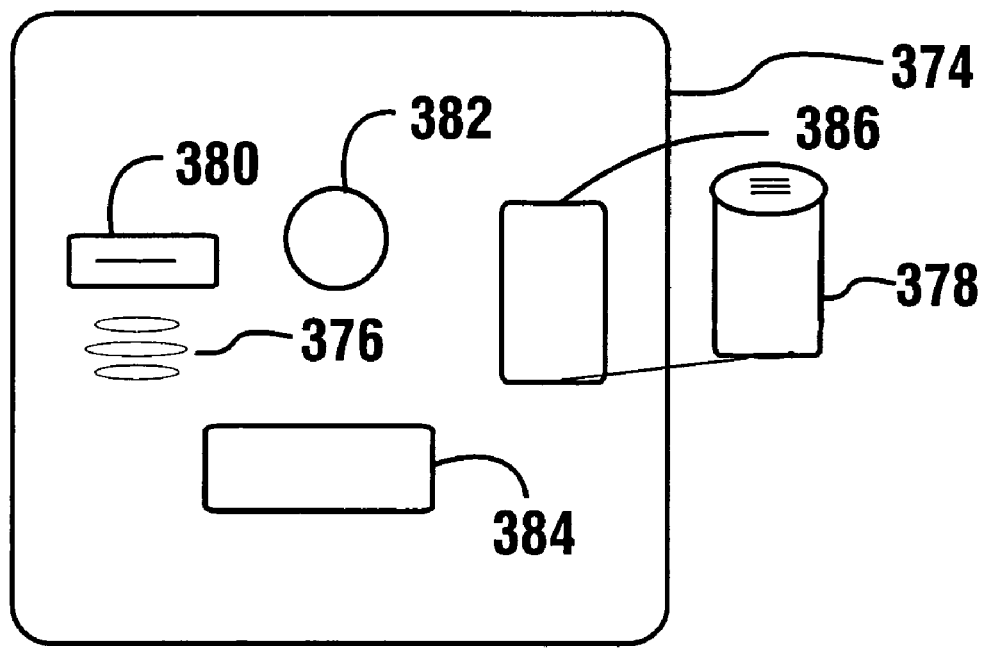
FIG. 16 is a front plan view of a user interface of yet another alternative embodiment of an ATM that does not include a screen output.

FIG. 16 shows an alternative ATM 374. ATM 374 may generally be like the ATMs previously described, except as specifically indicated. For example, ATM 374 may be an ATM having mechanisms and capabilities like those shown in U.S. Pat. No. 6,749,111, the disclosure of which is incorporated herein by reference. Of course, this ATM structure is merely exemplary.

ATM 374 includes a fascia which does not include a screen or other visible output device. Rather, all users of ATM 374 operate the machine through audible instructions which may be received through the speaker 376 or handset 378. ATM 374 also includes a card reader represented by a card reader slot 380, and a movable item which comprises a knob 382, which may be operated in a manner that previously described. ATM 374 also includes an opening 384 through which cash is dispensed and items for deposit are received. Of course it should be understood that other types of devices may be included or used in lieu of those specifically discussed. For example, in some embodiments a biometric type reader may be used to identify a user or their accounts instead of a card reader.

In the exemplary form of ATM 374, sighted or blind users are prompted through audible outputs to input their card through the card reader 380. This may be done either through outputs from the speaker 376 or by prompting the user to pick up the handset 378 and then providing the audible instructions through the handset. In an exemplary embodiment, once the handset 378 is removed from the holding cradle 386, the computer is operative to cause the speaker 376 to no longer provide outputs.

ATM 374 may operate in the manner described in connection with ATM 370 to cause the user to input selections through movement of the knob 382. In this exemplary embodiment both blind and sighted users can readily provide the characters in their code which makes up their PIN or other information of a private nature, which is received by the ATM while minimizing the risk of interception. Alternatively as previously discussed this ATM may utilize the approach of providing the user either visually or audibly reference information concerning the position of the knob and thereafter the user may manipulate the knob the number of "clicks" or other increments from the reference position so as to provide an input without the machine producing audible or visual outputs which would indicate the character corresponding to the user's input. Also as previously discussed provision may be made through the programming of the one or more computers within the machine to output characters or values corresponding to the position through output devices or other methodologies that are not susceptible to interception by anyone other than the particular authorized user standing at the machine.

Also in this exemplary embodiment rotational movement of the knob may be used to provide inputs corresponding to a user's desired transaction options and amounts. As can be appreciated, because exemplary ATM 374 does not include many of the input and output devices that are used in conjunction with other types of ATMs, the cost associated with ATM 374 may be reduced.

Figure 17:
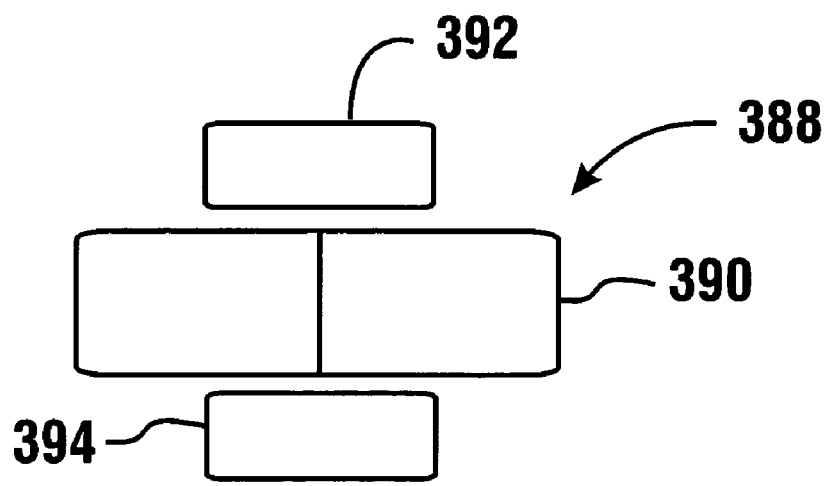
FIG. 17 is a schematic view of an alternative input device for use in conjunction with an ATM.

It should be understood that even though some exemplary embodiments have been described as using rotational items such as a knob that is movable relative to the ATM as the device for providing user selections to the ATM, other types of movable items and members may be used. These may include, for example, movable levers, handles, or other members. In addition, while the knobs previously described are movable through a plurality of positions, each or which positions may correspond to an audible or other ATM output, and are also used to indicate the user's selection, other embodiments may use different items or devices for incrementing the selections and then indicating the particular selection that the user has made. This is represented, for example, by the lever arrangement 388 shown in FIG. 17. Arrangement 388 includes a movable toggle 390. As can be appreciated, toggle 390 is an item is movable relative to the machine through a number of positions. Toggle 390 is generally rotatable about its generally vertically extending central axis responsive to pressing by a user's fingers in the areas disposed away from such axis. Thus, for example, in an exemplary ATM in which lever arrangement 388 is used, the ATM may audibly advise the user to press on the right side of the toggle to increment a selection upward and to press on the left side of the toggle to increment downward, until the desired character selection, transaction amount, or other selection is heard.

Once the desired audible selection is heard, the user can be instructed to press on an upper button 392, to indicate that the audible output is the one selected by the user. In addition, the user may be instructed through audible outputs in the machine that they can press the lower button 394 to cancel a selection they have previously input if they find they have made a mistake.

Of course, the lever/button arrangement is merely exemplary of an arrangement of one or more items that are movable relative to the fascia that may be used for providing user selections to the ATM. Further, it should be understood that although audible outputs provided through a headset, handset, speaker or similar device have been discussed with exemplary embodiments, other embodiments of the invention may use other types of nonvisible outputs that are perceivable by a user.

Referring again to FIG. 15, in another exemplary embodiment knob 372 is in operative connection with one or more computers in ATM 370. Knob 372 is further operatively connected to an encoder for indicating rotational position, a switch for sensing axial movement, and a solenoid and brake device. These devices are operatively connected to the computer for purposes of indicating to the computer the rotational and axial positions of the knob. The solenoid and brake devices are operative to provide perceptible outputs which can be perceived by a user who is touching the knob as in previously discussed embodiments.

In this exemplary embodiment, perceptible outputs associated with the rotational position of knob 372 correspond to the digits "0" through "9". In this exemplary embodiment, as a user rotates knob 372 in a first angular direction, the rotational position associated with the digit "9" is attained. To inform the user that "9" has been reached, the solenoid and/or brake devices are employed to provide a nonvisual output. In this exemplary embodiment, the output is an increased resistance to further rotation of knob 372. In like manner, as a user rotates knob 372 in a second, opposite angular direction, eventually the rotational position associated with the digit "0" is attained. To inform the user that "0" has been reached the solenoid and/or brake devices are employed to provide a nonvisual output such as a tactile sensation that imitates a physical stop. In this exemplary embodiment, other nonvisual outputs perceptible to a user are associated with the remaining digits. Thus, a user is assisted in selecting appropriate inputs to the machine.

In another exemplary embodiment, the rotational position associated with the digit "5" is provided with a unique nonvisual output in order to allow a user to readily ascertain the rotational position. The unique nonvisual output may be a manually perceptible vibration or buzz. The output associated with the digit "5" may function as a manually perceptible indicator in much the same way as the bump on the 5 on a keypad or the raised portions on the "f" and "j" keys on a computer keyboard. Thus, a user may readily ascertain a rotational position of the knob 372 and the digits to which the positions are associated. Of course as previously discussed in some embodiments the machine may vary the physical position that corresponds to a particular character or value responsive to operation of the computer.

In yet another exemplary embodiment, the ATM 370 may operate responsive to the programming of the computer in a first mode wherein the rotational position of knob 372 corresponds to the digits "0" through "9" as disclosed above and in a second mode wherein the rotational position of knob 372 corresponds to various command choices. The command choices can include commands such as "enter" or "cancel." Alternately, or in addition, the command choices may include transaction type selections such as "withdrawal", "deposit", "account balances" and the like.

In this exemplary embodiment, the ATM 370 may operate responsive to the programming of the computer to change between first and second modes through rotation of knob 372. In the exemplary embodiment, the computer is programmed to provide the knob with two angularly disposed zones separated by a manually perceptible effect called a "hill." For example, when the computer operates in the first mode, rotation of the knob 372 to the left may lead to the "0" position, which is perceptible by the tactile sensation of a stop preventing further rotation as described above. Rotation of the knob 372 to the right would lead to a series of perceptible vibrations or "clicks" each corresponding to a value up to the "9" position. Further attempted rotation beyond the "9" position results in an increased resistance to rotation. In this exemplary embodiment, continued rotation of knob 372 to the right encounters initial increased resistance to rotation followed by a sharp decline in resistance to rotation. This movement of the rotatable member "over the hill" of resistance causes the computer to operate in the second mode. In the second mode, rotational positioning of knob 372 corresponds to command and/or transaction options.

In order to provide a user with manually perceptible information about which mode the computer is operating in, in this exemplary embodiment, the outputs provided in the first mode may be perceptibly different than the outputs provided in the second mode. For example, in the first mode, when the outputs are associated with digits, the outputs may be "closer," meaning that sequential outputs are generated at smaller intervals of rotation, whereas in the second mode, sequential outputs may require a greater degree of rotation of knob 372. In other exemplary embodiments, the outputs in the first mode may include, for example, a first vibratory action, and the outputs in the second mode may include a different vibratory action. In other exemplary embodiments, outputs in the first mode may include vibratory signals and outputs in the second mode may include audible signals.

FIGS. 18 through 21 disclose exemplary screen outputs from ATM or other self service terminal that uses a knob or other movable item to provide inputs. The output shown in FIGS. 18 through 21 may be output responsive to operation of a computer through a display such as a CRT or LCD type display which provides visual outputs to users of the machine. The display outputs indicated may be accompanied by audible outputs in some embodiments. Of course it should be understood that in some embodiments the visual displays indicated may differ or not be output at all in situations when the machine is operated by a blind user who receives instructions through a personal audio listening device such as headphones that can be operatively connected to the ATM.

Figure 18:
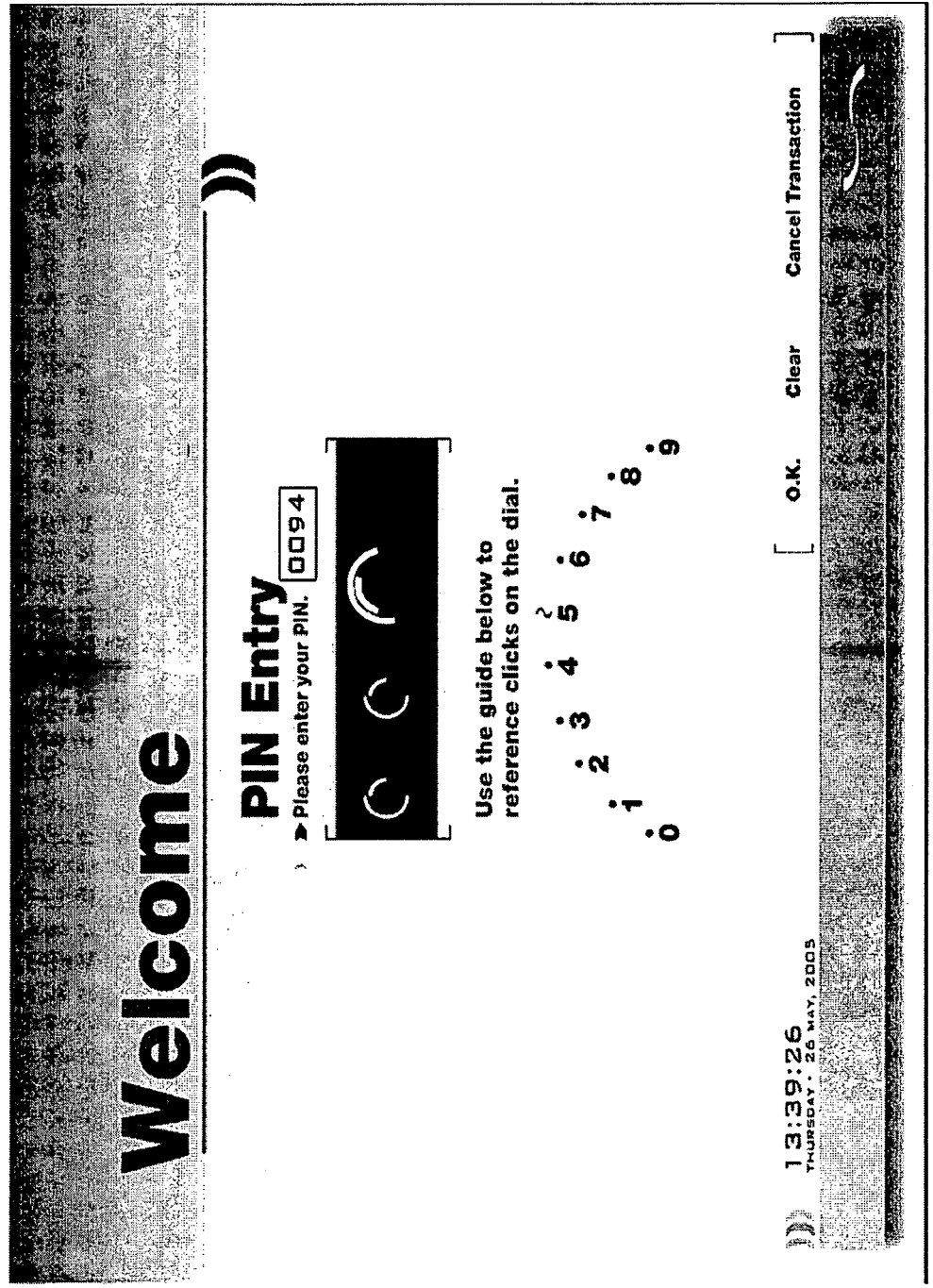
FIG. 18 is an exemplary display output provided by an ATM of an alternative embodiment in receiving a user's PIN input.

FIG. 18 shows a screen output that may be associated with the input of a customer PIN. At least one computer in the ATM is operative to provide audio outputs to indicate to the user the character, such as a numeral associated with the initial position of the knob. The user can then rotate the knob from a rotational position then indicated on the screen to place the knob at a position corresponding to a user's PIN digit. An input can then be provided by the user pushing inwardly on the knob. As previously discussed in some embodiments the screen may actually provide a numerical output indicative of the value corresponding to the current knob position. However in alternative embodiments no individual character outputs may be provided on the display and the user may determine the character corresponding to the current knob position based on landmarks associated with the various rotational positions. These manually perceptible landmarks may include for example a vibratory output when the knob is in the "5" position. This is indicated in FIG. 18 by the squiggle symbol adjacent to the "5" symbol. Resistance to movement counterclockwise may be encountered when rotation is attempted beyond the "0" position. Likewise resistance may be encountered when rotation clockwise is attempted beyond the "9" position. In the exemplary embodiment manually perceptible "clicks" are provided through the knob responsive to operation of the computer each time the knob is moved rotationally to a different position. As a result by manually sensing the landmarks a user is enabled to determine the values corresponding to a current position and to press the knob to select the value.

In some alternative embodiments the visual display may also include letters associated with various rotational positions. In this manner a user who has a PIN that is based on alphabetical characters may provide inputs. Likewise in some embodiments indicia may be provided through the screen indicating both numerical and alphabetical values associated with positions of the knob. Such associated numerical and alphabetical characters in some embodiments may be similar to those associated with the characters presented on a touch tone phone. In this matter a user is enabled to input alphabetical and numerical characters to provide a PIN to the ATM.

In the exemplary embodiment the user who has input their PIN is enabled to indicate the completion of their PIN input by turning the knob clockwise beyond the "9" position. As previously discussed in the exemplary embodiment the user encounters a resistance "hill" and eventually the knob reaches a position where changes of the rotational position of the knob correlate to transaction options. For example shown in FIG. 18 when the user has moved the knob to the angular region where positions of the knob correspond to transaction selections, the user is enabled to select between three options. These options include "OK," "clear," and "cancel transaction." When the user rotates the knob through positions "beyond the hill" these options are selectively highlighted. By pressing the knob inward when the "OK" is selected the PIN is submitted and the computer will eventually use it to submit transaction data to a host. When the user believes that they have input their PIN correctly, they can select the "clear" option. When the user does not wish to conduct a transaction they can select the "cancel transaction" option. In response to this selection the at least one computer in the ATM will close the session and return the ATM user's card.

If the user has selected the "OK" option in an exemplary embodiment, the user is then presented with a screen which includes a number of different transaction options. These transactions may include for example, cash withdrawal, bill payment, balance inquiry, transfer funds between accounts or other options. As the user rotates the knob the indicia corresponding to the various options are selectively highlighted to visually distinguish the option corresponding to the then current position of the knob. Pressing the knob indicates that the user wishes to conduct the type of transaction associated with the then highlighted option. Of course this approach is exemplary.

In the exemplary embodiment once the user has selected a transaction option the at least one computer in the ATM is operative to present the user with addition outputs and possible selections as is appropriate for the selected option. Thus for example if the user has selected to conduct a withdrawal, the at least one computer may present a screen which asks the user what account they wish to withdraw the money from. The options may include for example, checking or savings. By rotating the knob, the various selections may be highlighted or otherwise designated. Pressing the knob indicates that the user wishes to proceed with the highlighted selection.

Figure 19:
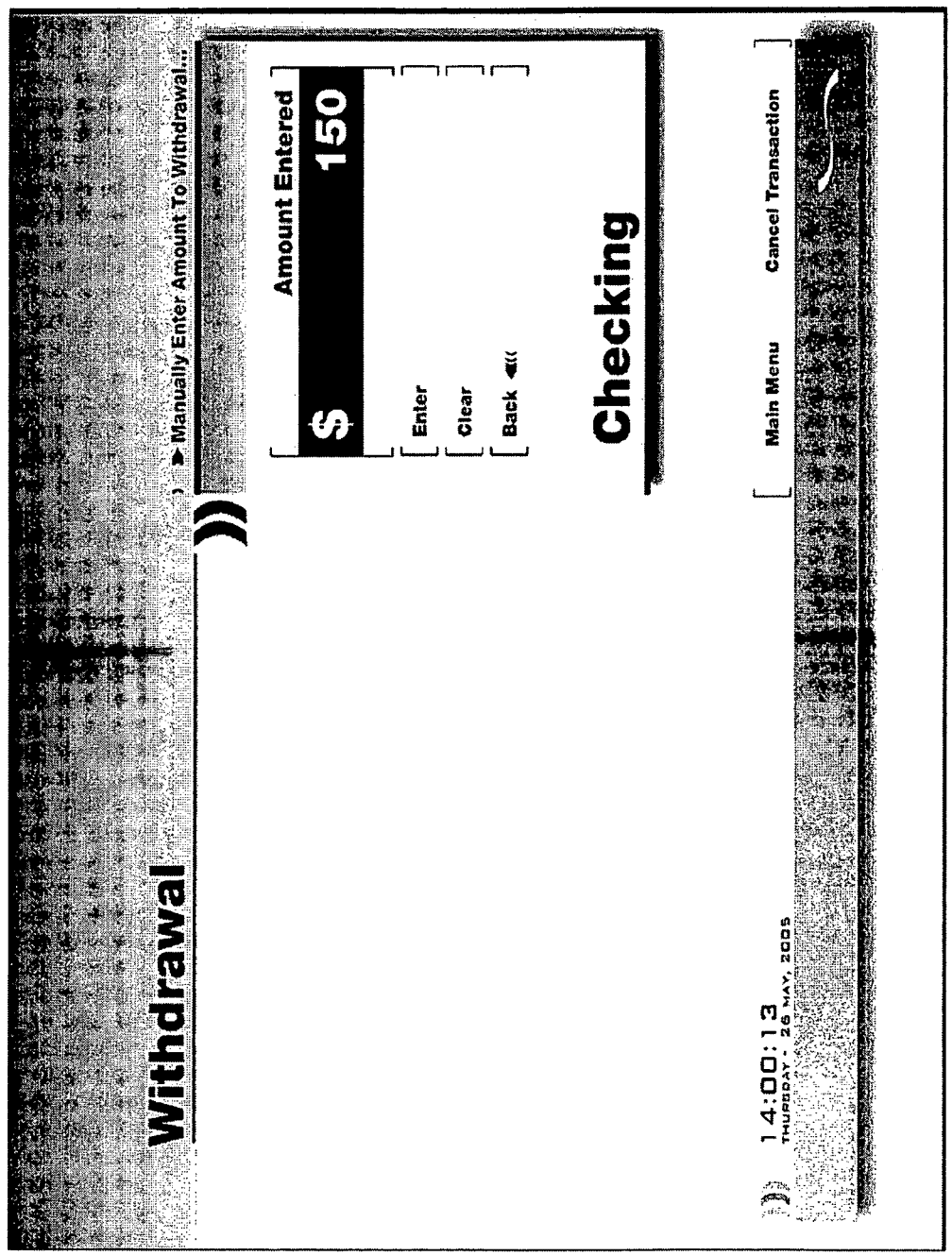
FIG. 19 is an exemplary display output associated with a cash withdrawal transaction.

FIG. 19 shows an exemplary display output when the user has selected a withdrawal from checking. With this output being presented the user turns the knob to manually input numerical values corresponding to the amount that they wish to withdraw. The user does this by turning the knob. As the knob is turned a numerical value is correspondingly changed on the screen. For example if a user wishes to withdraw $150 as shown, the knob is turned so that the characters "1," "5," and "0" are sequentially input. As previously mentioned, in some embodiments the at least one computer in the ATM may be operative to prevent the entry of certain amounts that the machine is not capable of handling. Likewise the computer may be programmed to impose maximum or minimums of particular values depending on the type of transaction.

In accordance with the exemplary embodiment associated with FIG. 19 once a user has input the amount, the user can choose to enter the amount and move to the next transaction step, clear it, return to an earlier step, return to the main menu or cancel the transaction. The user can input these selections by turning the knob out of the numerical input region until the various options are highlighted. Pushing the knob causes the machine to execute the highlighted option. In some exemplary embodiments manually perceptible resistance may be imposed electronically on the knob so that the user is aware that they are moving to different areas where different options are available.

For example if at the position shown in FIG. 19 the user rotates the knob so that the "enter" option is highlighted and the user then pushes the knob, the machine will then proceed to communicate with a host, and if the transaction is authorized, dispense cash in the amount the user has selected. The machine will also operate in accordance with its programming to carry out the other associated functions such as to print the user a receipt. The user will then be asked whether they wish to conduct another transaction and the user may respond by movement of the knob. Of course this approach is exemplary.

Figure 20:
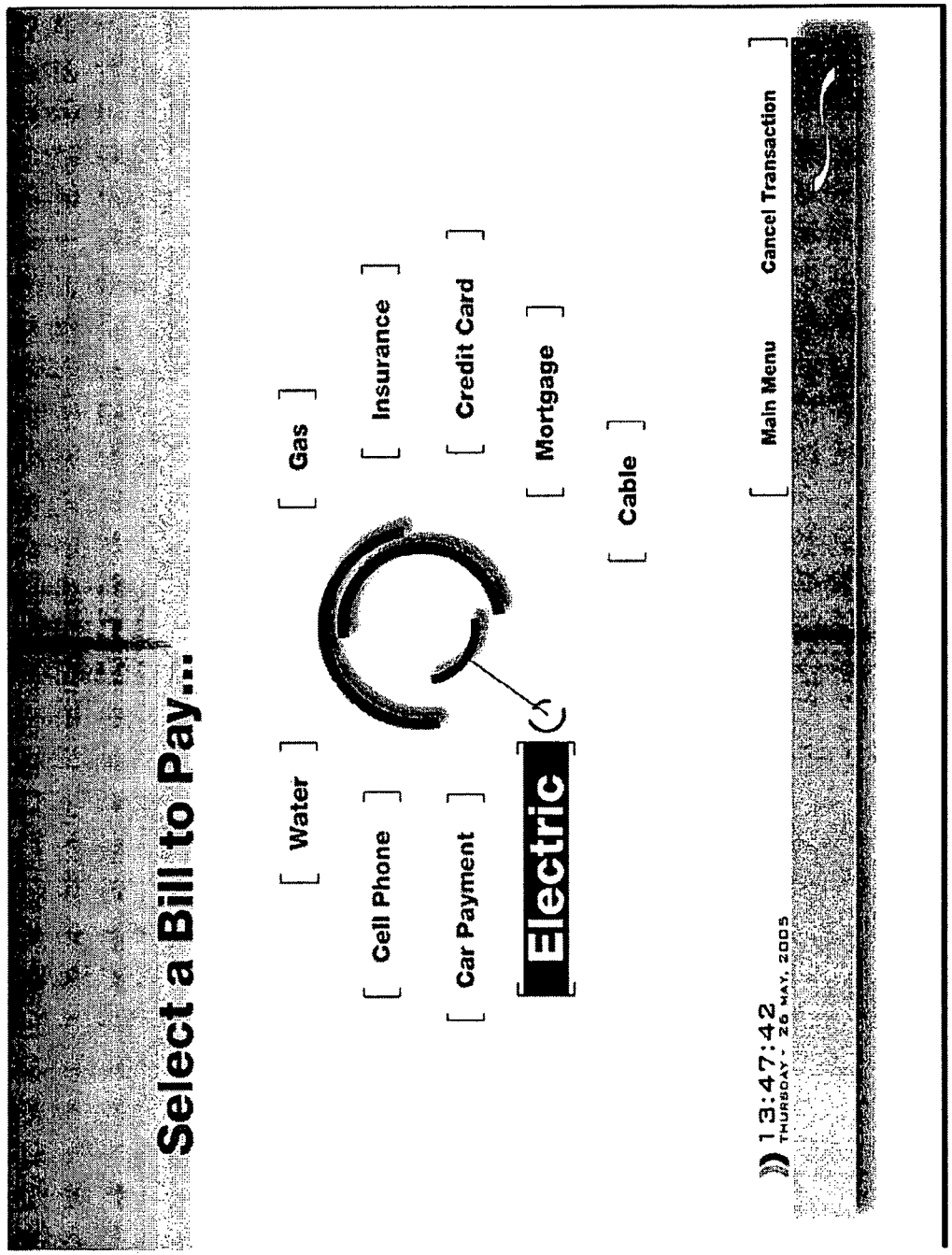
FIG. 20 is an exemplary display output associated with selection of a type of bill payment transaction.
Figure 21:
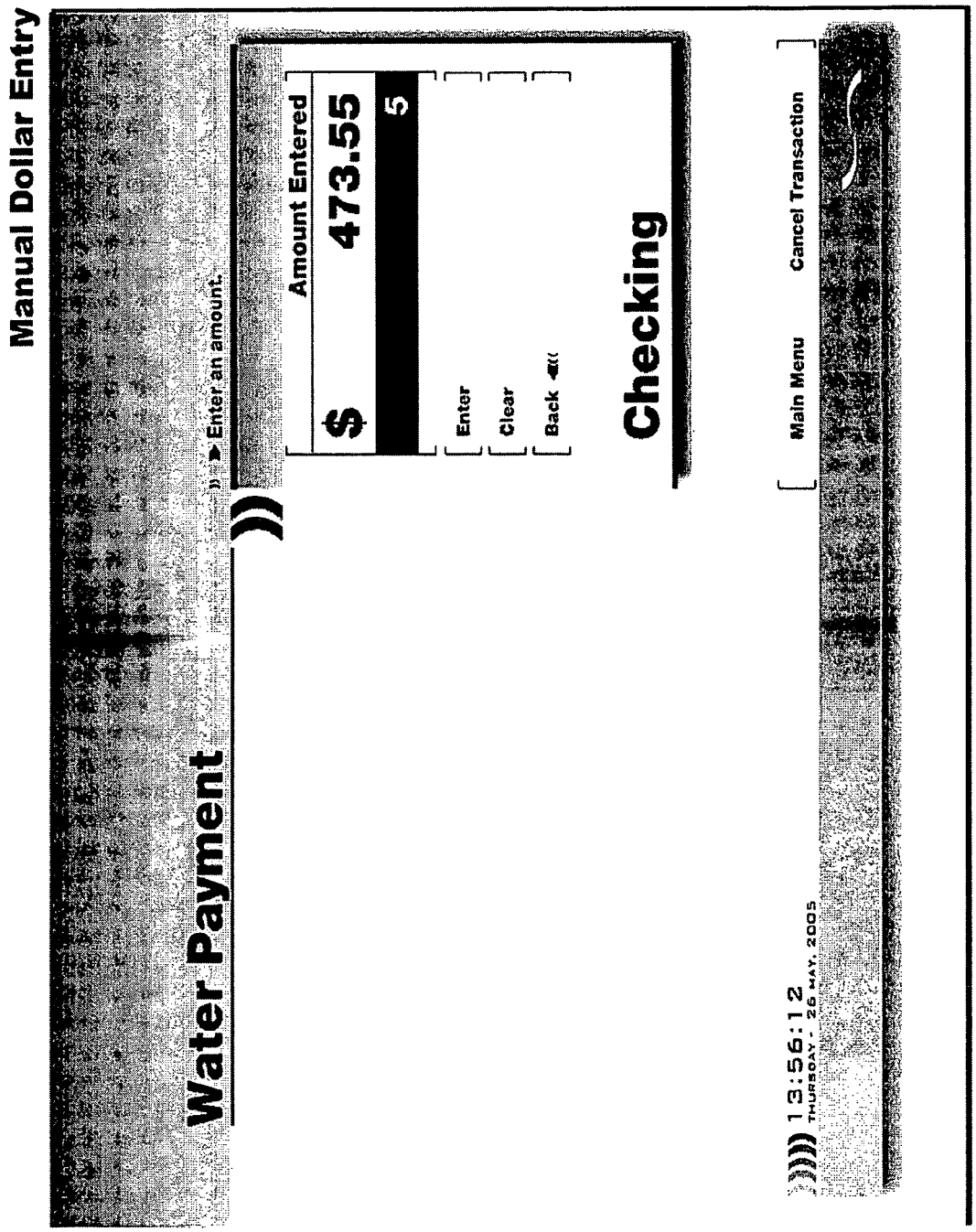
FIG. 21 is an exemplary display output associated with a bill payment transaction.

As previously discussed another option that a user of the exemplary machine may have among various transaction options presented is to pay a bill. If the user selects such an option, an exemplary embodiment may present a display output similar to that shown in FIG. 20. FIG. 20 shows indicia corresponding to numerous types of bill payment options. The user can select one of these options by rotating the knob so as to indicate the particular type of bill payment desired. The option corresponding to the then current rotational position of the knob is visually distinguished on the display. This may be done by highlighting the indicia, but other approaches may be used. Pressing on the knob with the particular selection highlighted causes the machine to proceed to the next step of the transaction sequence. It should be appreciated that each of the numerous possible rotational positions of the knob in the exemplary embodiment can provide the user with large numbers of possible selections and transaction options. These transaction options may be substantially greater than those that are possible through function keys adjacent to an ATM screen. In addition the layout of the transaction options can be varied on the screen to facilitate user selection. In addition as can be appreciated in FIG. 20, the user is also enabled in the exemplary embodiment to turn the knob to a position so that they can cancel a transaction or return to the main menu.

As can be appreciated transaction selections such as bill payment when selected by the ATM user will result in the user being presented with further selections. These may include for example a request to indicate the source of the funds which will be used to make the payment. This may include for example a screen in which a user selects between checking, savings or credit card accounts for example. Of course this approach is exemplary.

Once the user has selected the source of the funds the at least one computer in the ATM may operate to present an output to the user in which they are prompted to input the amount of the bill being paid. This can be accomplished by the user turning the knob to input the appropriate numerical value. As reflected in FIG. 21, the user can enter the value, clear it, cancel the transaction or return to prior transaction steps. Of course in some embodiments the ATM may include devices for reading or accepting the various types of bills or other documents associated with the particular type of transaction being conducted.

As the foregoing exemplary embodiments show, the use of a rotatable knob or other movable member can be used to provide inputs that correspond to transaction selections, numerical values and alphabetical characters. The knob with electronically controllable manual feedback features of the exemplary embodiment can also be used to provide manual outputs to the user so as to facilitate navigation between the various possible input selections. In addition as can be appreciated, in the exemplary embodiment the various manually perceptible landmarks, gradations, limits and other manually perceptible outputs may be generated electronically to suit the particular interface design. The ability to integrate such manual feedback with visual and/or audible prompts to the user enables providing a user interface that is more readily understood and navigated by the user. Of course the approaches described are exemplary and in other embodiments other approaches may be used.

A further aspect of some exemplary embodiments is that the visual outputs provided by the ATM may be in the nature of animations that correspond to movements of the knob or other device by a user. Generally in ATM transactions using other types of input devices ATMs will provide screen outputs that are static. When the machine moves to a different transaction step or state, a different appropriate static screen output is presented.

In the exemplary embodiment the animation programming features such as a Flash media environment may be used to provide animated screen outputs that correspond to movement of the knob or other input device. For example programming may be conducted for a browser based environment with .swf extensions so as to provide animated outputs on the screen. These animated visual outputs may move continuously as the user moves the knob so as to provide the user with a feeling that they are actually controlling the display. For example as previously discussed, in the exemplary embodiment the user rotates the knob and highlights the transaction selections. In embodiments where the display outputs include animation, the outputs can show movement of an indicator between one transaction selection and another. This is in contrast to static type selections where visual outputs will abruptly jump between one output and another. This sensation by the user that they are actually controlling aspects of the screen output continuously with movement of the knob or other movement device, provides additional opportunities to provide a user interface that is readily understood even by individuals that have never used the machine previously.

Likewise in some embodiments the programming of the at least one computer in the ATM may provide animated display outputs which facilitate a user's understanding of the machine. These may include for example, the display of moving disks which suggest to a user the manner in which to rotate the knob so as to achieve a particular result. Likewise the indicator for particular input characters that result in a vibration of the knob may likewise visually simulate the vibration through an output on the screen. Other aspects of the visual outputs may be provided as is appropriate for facilitating operation of the ATM.

Of course it should be understood that these described approaches are exemplary and in other embodiments other approaches may be used.

Thus, the new automated banking machine system and method of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
    (a) operating an automated banking machine to read user-provided data, wherein the machine includes a cash dispenser, a hand-operable movable item, and at least one computer in operative connection with the cash dispenser and the item;
    (b) operating the machine to cause different touch-perceptible outputs to be provided through the item responsive to user movement of the item to different positions, wherein the outputs are user perceivable through hand contact with the item, wherein the different positions respectively correspond to different characters;
    (c) operating the machine to receive through the item, user inputs at respective different item positions, wherein the received inputs correspond to a multicharacter code; and
    (d) operating the machine to allow a transaction involving the cash dispenser to be carried out responsive to the code in step (c) having a corresponding relationship to the data read in step (a).

2. The method according to claim 1 wherein (b) further comprises providing audible outputs from the machine responsive to each of the different positions.

3. The method according to claim 2 wherein in (b) an audible output comprises an electronically simulated voice output.

4. The method according to claim 2 wherein in (b) the audible output is provided to the user through at least one of head phones, a handset, and a speaker.

5. The method according to claim 1 and further comprising:
    prior to (b), providing the user with a nonvisible output indicating a character corresponding to an initial position of the item.

6. The method according to claim 5 wherein in (b) the character corresponding to the initial position is independent of a then current position of the item.

7. The method according to claim 6 wherein in (b) the character corresponding to the initial position is selected at random through operation of the machine.

8. The method according to claim 1 and further comprising:
    prior to (b), providing the user with a nonvisible output indicating how to move the item to positions corresponding to different characters.

9. The method according to claim 1 wherein (b) further comprises causing the outputs to be provided responsive to user movement of the item along a first direction,
    wherein movement of the item along the first direction causes outputs indicating characters corresponding to each of the positions, and movement of the item in a second direction different from the first direction selects a character to be included in the code.

10. The method according to claim 9 wherein (b) is responsive to movement of the item rotationally between a plurality of angular positions, and axially movement to select a character corresponding to an output provided by the machine in a particular position as included in the code.

11. The method according to claim 1 wherein (b) includes operating the machine to provide nonvisible outputs which include manually sensible outputs.

12. The method according to claim 1 wherein the machine is configured to provide a plurality of transaction selections, wherein the machine is configured to provide the user with touch-perceptible outputs perceivable by the user indicating the plurality of transaction selections, wherein each transaction selection corresponds to a respective one of a plurality of item positions, wherein dispensing cash is one of the plurality of transaction selections, and further comprising:
    (e) operating the machine to receive through the item a transaction selection from the user;
    wherein the machine is operative to dispense cash responsive to the transaction selection received by the machine in (e).

13. The method according to claim 12 and further comprising providing a user with at least one audible output responsive to the transaction selection received in (e).

14. The method according to claim 12 and further comprising
    (f) operating the machine to provide a plurality of outputs corresponding to transaction selections responsive to the item being moved along a first direction; and
    (g) operating the machine to receive the transaction selection responsive to the item being moved in a second direction different from the first direction.

15. The method according to claim 14 wherein in (f) the item is moved rotationally between a plurality of positions to provide the plurality of transaction selection outputs, and in (g) the item is moved axially to cause the machine to receive the transaction selection.

16. The method according to claim 1 wherein in (b) the different characters correspond to letters in an alphabet.

17. The method according to claim 1 wherein in (b) the characters correspond to digits.

18. The method according to claim 17, wherein in (b) at least some characters correspond to two digit numbers.

19. The method according to claim 1 wherein the item comprises a rotatable member manually rotated by the user, and wherein in (b) the rotatable member provides a manually perceptible vibratory output corresponding to at least one change in rotational position of the rotatable member.

20. The method according to claim 19 wherein in (c) the machine operates to receive a character in the code responsive to the user pressing on the rotatable member.

21. The method according to claim 20 wherein in (b) when the user presses on the rotatable member, the machine provides the user with a first output perceivable by the user, wherein the first output is indicative of a character.

22. The method according to claim 19 wherein in (b) the rotatable member has no position markings.

23. The method according to claim 1 and further comprising:
    (e) receiving an amount selection from the user through operation of the machine;
    wherein the amount selection corresponds to an amount of cash requested to be dispensed.

24. The method according to claim 23 and further comprising:

(f) operating the machine to provide outputs indicating a plurality of amounts, each amount corresponding to a respective one of a plurality of item positions.

25. The method according to claim 24 wherein (f) is responsive to movement of the item along a first direction through each of the plurality of positions corresponding to the plurality of amounts, and wherein (e) includes operating the machine to receive a selected amount responsive to movement of the item in a second direction different from the first direction.

26. The method according to claim 24 wherein the item comprises a rotatable member, and wherein in (f) the rotatable member is moved in a rotational direction through a plurality of rotation positions corresponding to the plurality of amounts, and wherein in (e) the rotatable member is pressed to cause the machine to receive an amount selection.

27. The method according to claim 26 and further comprising providing to the user a nonvisible output perceivable by the user, wherein the output is indicative of the amount selected.

28. The method according to claim 1 wherein the machine is configured to provide a plurality of different transaction selections, wherein dispensing cash corresponds to one of the transaction selections, and wherein the item comprises a rotatable member, and wherein (c) includes causing the machine to receive characters inputted by the user axially moving the rotatable member, and further comprising:
  (e) receiving with the machine a transaction selection from the user subsequent to the user rotating the rotatable member through a plurality of positions corresponding to a plurality of transaction selections, wherein each transaction selection corresponds to a respective one of the plurality of positions, and wherein user selection of a transaction is through axially movement of the rotatable member;
  (f) receiving with the machine an amount selection subsequent to the user moving the rotatable member through a plurality of angular positions corresponding to a plurality of amounts, wherein each amount corresponds to a respective one of the plurality of positions, and wherein user selection of an amount is through axially movement of the rotatable member.

29. At least one computer readable medium including computer executable instructions operative to cause at least one computer in an automated banking machine including a cash dispenser to cause the automated banking machine to carry out a method comprising:
  (a) operating the automated banking machine to read user-provided data, wherein the machine includes a hand-operable movable item;
  (b) operating the machine to cause different touch-perceptible outputs to be provided through the item responsive to user movement of the item to different positions, wherein the outputs are user perceivable through hand contact with the item, wherein the different positions respectively correspond to different characters;
  (c) operating the machine to receive through the item, user inputs at respective different item positions, wherein the received inputs correspond to a multicharacter code; and
  (d) operating the machine to allow a transaction involving the cash dispenser to be carried out responsive to the code in step (c) corresponding to the data read in step (a).

30. The at least one computer readable medium of claim 29 and further comprising computer executable instructions operative to cause the automated banking machine to receive through the item, transaction selection input from the user.

31. The at least one computer readable medium of claim 29 and further comprising computer executable instructions operative to cause the automated banking machine to receive through the item, amount selection input from the user, wherein the amount selection input corresponds to an amount of cash requested to be dispensed.

32. The at least one computer readable medium of claim 29 and further comprising computer executable instructions operative to cause the automated banking machine to
  receive through the item, transaction selection input from the user responsive to user rotation of the item through a plurality of positions, and
  receive through the item, amount selection input from the user responsive to user movement of the item through a plurality of angular positions.

33. A method comprising:
  (a) operating an automated banking machine to provide at least one tangible output through a user input device,
    wherein the machine includes a cash dispenser and at least one computer in operative connection with the cash dispenser and the device,
    wherein the device allows different user inputs to be made therethrough to the at least one computer responsive to at least one physically contacting engagement with the device by a user of the machine,
      wherein the different user inputs include at least one user input associated with a transaction involving the cash dispenser,
    wherein the device allows different tangible outputs to be provided therethrough,
    wherein the different tangible outputs include at least one output associated with the transaction involving the cash dispenser,
    wherein each tangible output is touch-perceptible, enabling the user to feel the tangible output through physical contact with the device; and
  (b) operating the at least one computer to receive at least one user input through the device responsive to at least one physically contacting engagement with the device by the user.

34. The method according to claim 33,
  wherein the device is physically movable by the user to different positions,
    wherein different positions respectively allow different inputs to be made by the user through the device,
      wherein each user input respectively corresponds to device position at time of input,
      wherein at least one position allows user input associated with the transaction involving the cash dispenser,
    wherein movement of the device to the different positions respectively causes different tangible outputs to be provided through the device,
      wherein each output is respectively associated with a current position of the device,
  wherein step (a) includes operating the machine to provide through the device, at least one tangible output responsive to movement of the device,
  wherein step (b) includes operating the machine to receive through the device, at least one user input corresponding to device position at time of the at least one user input.

35. A method comprising:
  (a) operating an automated banking machine to read user-provided data, wherein the machine includes a hand movable input device, at least one transaction function device operative to carry out at least a portion of a financial transaction, and at least one computer in operative connection with the at least one transaction function device and the input device;

(b) operating the machine to cause different touch-perceptible outputs to be provided through the input device responsive to user movement of the input device to different positions, wherein the outputs are user perceivable through hand contact with the input device, wherein the different positions respectively correspond to different characters;

(c) operating the machine to receive through the input device, user inputs at respective different device positions, wherein the received inputs correspond to a multicharacter code; and (d) operating the machine to carry out a financial transaction including operation of the at least one transaction function device responsive to the code in step (c) having a corresponding relationship to the data read in step (a).

* * * * *